(12) United States Patent
Oohara et al.

(10) Patent No.: US 8,284,263 B2
(45) Date of Patent: *Oct. 9, 2012

(54) OPTICAL UNIT AND IMAGE PICKUP APPARATUS HAVING AN OPTICAL DEVICE AND A POLYMER ACTUATOR FOR MOVING THE OPTICAL DEVICE

(75) Inventors: Masamichi Oohara, Kadoma (JP); Yoshihiro Tanaka, Osaka (JP); Shigeru Wada, Kishiwada (JP); Yoshihiro Hara, Takatsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 948 days.

This patent is subject to a terminal disclaimer.

(21) Appl. No.: 11/805,219

(22) Filed: May 22, 2007

(65) Prior Publication Data

US 2007/0285558 A1    Dec. 13, 2007

(30) Foreign Application Priority Data

May 30, 2006  (JP) .................................. 2006-149538
May 14, 2007  (JP) .................................. 2007-127728

(51) Int. Cl.
*H04N 5/228* (2006.01)

(52) U.S. Cl. ............. 348/208.7; 348/208.4; 348/208.99; 348/357; 396/55; 396/133; 359/554; 362/272; 362/286; 362/324

(58) Field of Classification Search ............... 348/208.7, 348/257
See application file for complete search history.

(56) References Cited

U.S. PATENT DOCUMENTS

| 6,710,950 | B2* | 3/2004 | Rouvinen et al. | 359/824 |
|---|---|---|---|---|
| 2003/0117719 | A1* | 6/2003 | Wakai et al. | 359/726 |
| 2004/0012683 | A1* | 1/2004 | Yamasaki et al. | 348/208.1 |
| 2006/0092311 | A1* | 5/2006 | Hartlove et al. | 348/340 |
| 2006/0175532 | A1* | 8/2006 | Boemler | 250/208.1 |
| 2007/0070235 | A1* | 3/2007 | Maejima et al. | 348/335 |
| 2007/0103555 | A1* | 5/2007 | Eromaki | 348/208.4 |
| 2007/0279497 | A1* | 12/2007 | Wada et al. | 348/208.7 |
| 2009/0135260 | A1* | 5/2009 | Rouvinen et al. | 348/208.11 |

FOREIGN PATENT DOCUMENTS

| JP | 10-106013 A | | 4/1998 |
|---|---|---|---|
| JP | 10-285475 | * | 10/1998 |
| JP | 2003-204470 A | | 7/2003 |
| JP | 2005-278133 A | | 10/2005 |
| JP | 2005-330457 A | | 12/2005 |

* cited by examiner

*Primary Examiner* — Sinh Tran
*Assistant Examiner* — Paul Berardesca
(74) *Attorney, Agent, or Firm* — Cozen O'Connor

(57) ABSTRACT

An optical unit and image pickup apparatus capable of performing "auto focus function" and "image shake correction function" and characterized by easy assembling, compact configuration, high performance and reduced costs is provided. The optical unit and image pickup apparatus are provided with a polymer actuator to move an optical device, whereby performing auto focus function and image shake correction function can be performed. The polymer actuator is provided with electric wirings for image pickup device, thereby reducing the number of circuit board used for electric wiring of the image pickup device, with the result that an optical unit and image pickup apparatus characterized by easy assembling, compact configuration, high performance and reduced costs are provided.

9 Claims, 15 Drawing Sheets

OPTICAL UNIT AND IMAGE PICKUP APPARATUS HAVING AN OPTICAL DEVICE AND A POLYMER ACTUATOR FOR MOVING THE OPTICAL DEVICE

This application claims priority on Japanese Patent Application No. 2006-149538 filed on May 30, 2006, and on Japanese Patent Application No. 2007-127728 filed on May 14, 2007, in the Japanese Patent Office, the entire content of which applications are hereby incorporated by reference.

TECHNICAL FIELD

The present invention relates to an optical unit and an image pickup apparatus, particularly to an optical unit and an image pickup apparatus containing an auto focus and image shake correction sections using a polymer actuator as a drive source.

BACKGROUND

A compact image pickup apparatus mounted on a mobile phone is required to meet the requirements for compact configuration, low cost and enhanced function. The enhanced function can be achieved by incorporating an "auto focus functions" and "image shake correction functions" realized in a digital camera. In the conventional digital camera, an actuator best suited to each function has been independently developed and adopted.

For example, a voice coil motor using magnetic force and a linear actuator (SIDM=Smooth Impact Drive Mechanism) using an piezoelectric element as a drive source are used for the auto focus function, while shape memory alloys (SMA) are used for image shake correction function.

In the camera module mounted on a mobile phone, an actuator is formed on a substrate, on which an image sensor is mounted, so as to ensure compact configuration (e.g., Unexamined Japanese Patent Application Publication No. 2003-204470). In the lens holder of an optical pickup apparatus, a technique of integral formation of a focus and tilt support mechanism is proposed (e.g., Unexamined Japanese Patent Application Publication No. H10-106013).

However, the proposal of the Unexamined Japanese Patent Application Publication No. 2003-204470 is restricted to the image shake correction function. For example, a separate actuator must be provided to implement auto focus function. In the proposal made in the Unexamined Japanese Patent Application Publication No. H10-106013, two actuators are separately used for focusing and tilting, although the support mechanism is integrally built. Such extra small equipment as a mobile phone has a plurality of different actuators mounted thereon, although each of them is downsized, and hence big problems remain to be solved in the phase of size, ease of assembling and adjustment and production cost.

In the meantime, a polymer actuator is currently capturing the spotlight because of increased force, reduced weight, minimized noise, low voltage drive, and formation in a desired shape due to the material of resin.

In this context, a proposal has been made of a drive section of the correction apparatus in an image pickup apparatus provided with an image shake correction function that can be embodied by using a polymer actuator as a drive source (e.g., Unexamined Japanese Patent Application Publication No. 2005-330457).

Another proposal is a technique of eliminating the distortion of an image by bending an image pickup device in a convex form, using a polymer actuator as a drive source (e.g., Unexamined Japanese Patent Application Publication No. 2005-278133).

However, the proposal disclosed in the Unexamined Japanese Patent Application Publication No. 2005-330457 merely describes that the polymer actuator is preferably used in the drive section of the correction apparatus in an image pickup apparatus provided with image shake correction function, without mentioning any specified means or method. Further, although this is not directly related much to the present invention, it should be pointed out regarding the method proposed in the Unexamined Japanese Patent Application Publication No. 2005-278133 that, if external force is applied so as to bend a semiconductor element such as an image pickup device in a convex form, a crack of the element will occur, or element characteristics will be subjected to a change due to deflection, with the result that deterioration of characteristics will be caused.

Further, when the auto focus function or image shake correction function is to be performed by moving the image pickup device in the direction parallel or vertical to the optical axis, not only the image pickup device but also the circuit board with the image pickup device mounted thereon must be moved. This involves a problem of moving a large and heavy object.

SUMMARY

The object of the present invention is to solve these problems and to provide an optical unit and image pickup apparatus characterized by easy assembling, compact configuration, high performance and reduced costs by using a polymer actuator to move the image pickup device for the purpose of performing auto focus function and image shake correction function, and by providing a polymer actuator with electric wiring of an image pickup device, thereby reducing the number of circuit boards used for electric wiring of the image pickup device. In view of forgoing, one embodiment according to one aspect of the present invention is an optical unit, comprising:

an optical system;
an optical device; and
a polymer actuator which moves the optical device,
wherein an electrical wiring which is connected to the optical device is provided on the polymer actuator.

According to another aspect of the present invention, another embodiment is an image pickup apparatus, comprising
an optical unit; the optical unit including:
an optical system;
an image pickup device; and
a polymer actuator which moves the image pickup device;
wherein an electrical wiring which is connected to the image pickup device is provided on the polymer actuator,
a focus detection section which detects a focus condition of a subject image provided by the optical system; and
a drive section which moves the image pickup device in a direction of an optical axis of the optical system based on a detection result of the focus detection section by means of the polymer actuator.

According to another aspect of the present invention, another embodiment is an image pickup apparatus, comprising
an optical unit; the optical unit including:
an optical system;
an image pickup device; and a polymer actuator which moves the image pickup device;
wherein an electrical wiring which is connected to the image pickup device is provided on the polymer actuator,
a shake detection section which detects a shake of the optical unit; and
a drive section which moves the image pickup device in a direction perpendicular to an optical axis of the optical system based on a detection result of the shake detection section by means of the polymer actuator.

According to another aspect of the present invention, another embodiment is an image pickup apparatus, comprising
an optical unit; the optical unit including:
an optical system;
an image pickup device; and
a polymer actuator which moves the image pickup device;
wherein an electrical wiring which is connected to the image pickup device is provided on the polymer actuator,
a focus detection section which detects a focus condition of a subject image provided by the optical system;
a shake detection section which detects a shake of the optical unit; and
a drive section which moves the image pickup device in a direction of an optical axis of the optical system based on a detection result of the focus detection section by means of the polymer actuator, and moves the image pickup device in a direction perpendicular to the optical axis of the optical system based on a detecting result of the shake detection section by means of the polymer actuator.

DETAILED DESCRIPTION OF THE PREFERRED EMBODIMENT

Figure 1:
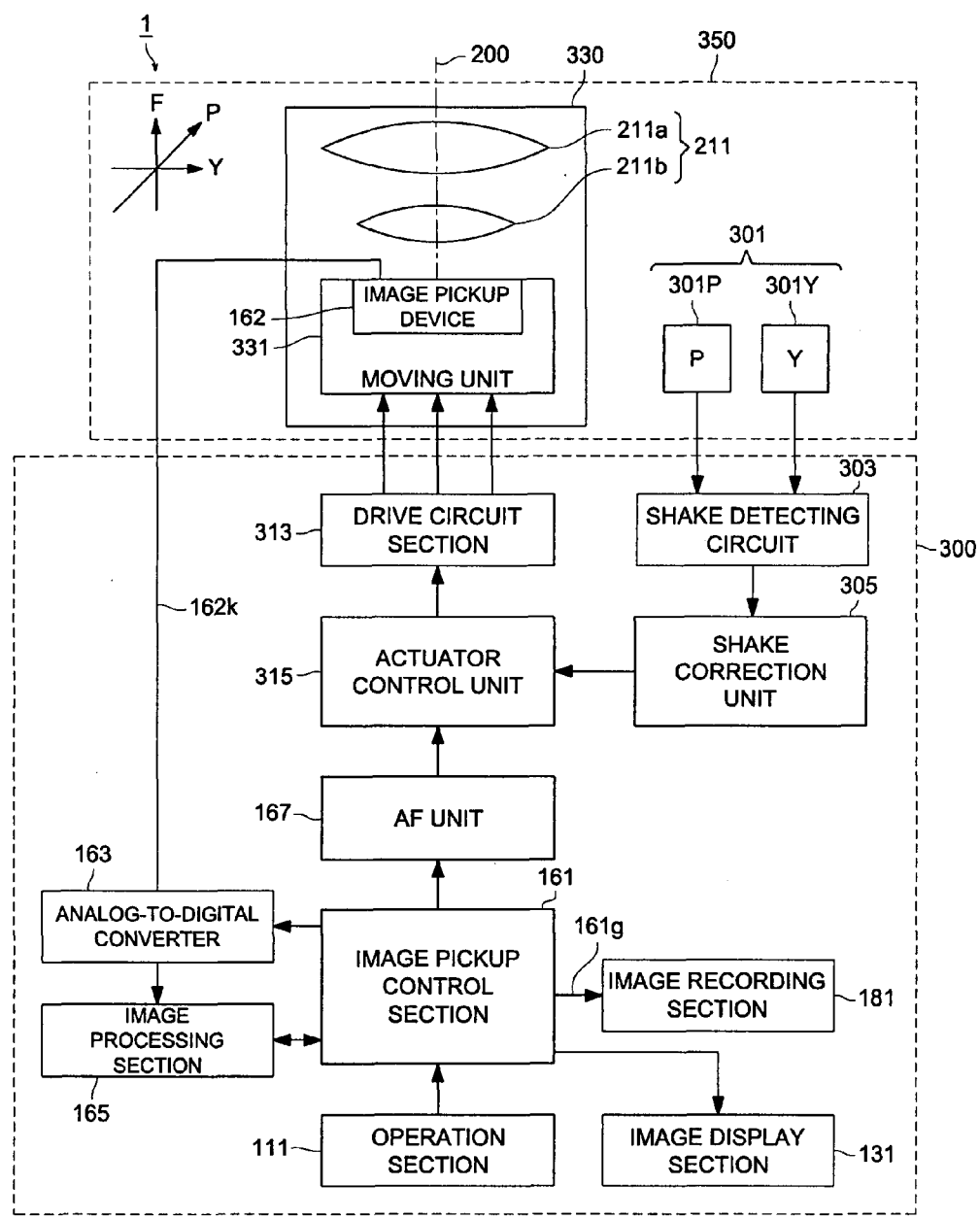
FIG. 1 is a schematic diagram representing the structure of an image pickup apparatus.

The following describes the embodiments of the present invention with reference to drawings. The same portions in the drawing will be assigned with the same numerals of reference, and will not be described to avoid duplication.

Referring to FIG. 1, the following describes the image pickup apparatus as an embodiment of the present invention. FIG. 1 is a schematic diagram representing the structure of the image pickup apparatus.

In FIG. 1, an image pickup apparatus 1 is made up of an image pickup section 350 and an image pickup circuit 300. The image pickup section 350 includes an image pickup unit 330 and a shake detecting unit 301. The image pickup unit 330 includes a pickup optical system 211 made of a lens 211a and lens 211b, an image pickup device 162 and a moving unit 331. The shake detecting unit 301 is formed of a vertical shake sensor 301P (P for pitch) and a horizontal shake sensor 301Y (Y for yaw). In this case, the image pickup unit 330, pickup optical system 211 and image pickup device 162 correspond to the optical unit, optical system and optical device respectively of the present invention.

The image pickup circuit 300 includes a shake detecting circuit 303, shake correction unit 305, AF unit 167, actuator control unit 315, drive circuit section 313, image pickup control section 161, analog-to-digital (A/D) converter 163, image processing section 165, image recording section 181, operation section 111 and image display section 131. The drive circuit section 313 contains a step-up circuit which generates a voltage to drive the polymer actuator constituting the moving unit 331.

The image pickup apparatus 1 of FIG. 1 incorporates two major functions. One is an image pickup function and the other is an image pickup device moving function. The image pickup function will be described first. A subject image is formed on the image pickup surface of an image pickup device 162 by a pickup optical system 211. The subject image is subjected to photoelectric conversion by the image pickup device 162, and is outputted as pickup data 162k. The outputted pickup data 162k is converted into digital data by the analog-to-digital converter 163, and is subjected to such processing as white balance processing or gamma conversion by an image processing section 165. Then it is recorded in an image recording section 181 as image data 161g and is displayed properly on the image display section 131. A series of these pickup operations are controlled by the image pickup control section 161.

The image pickup device moving function is further divided into an image shake correction function for correcting shake of the image pickup apparatus 1, and an AF function for focusing the pickup optical system 211.

In the image shake correction function, shake is detected by the sensor of the shake detecting unit 301 and shake detecting circuit 303, and the amount of shake compensation is calculated by the shake correction unit 305. Voltage is applied to the polymer actuator constituting the moving unit 331 by the actuator control unit 315 and drive circuit section 313, and the image pickup device 162 is moved in the vertical direction of pitching (hereinafter referred to as "direction P")

and in the horizontal direction of yawing (hereinafter referred to as "direction Y"), thereby the shake is corrected.

Figure 3:
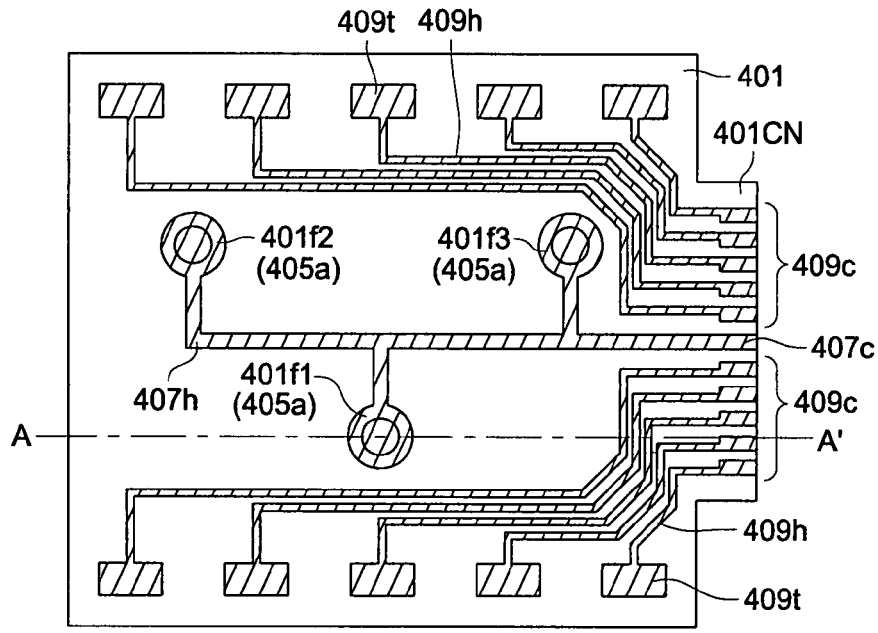
FIGS. 3(a), 3(b) and 3(c) are schematic diagrams representing the structure of the polymer actuator in a first embodiment.
Figure 3:
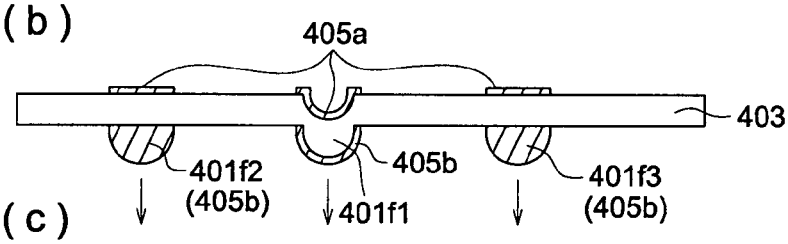
Figure 3:
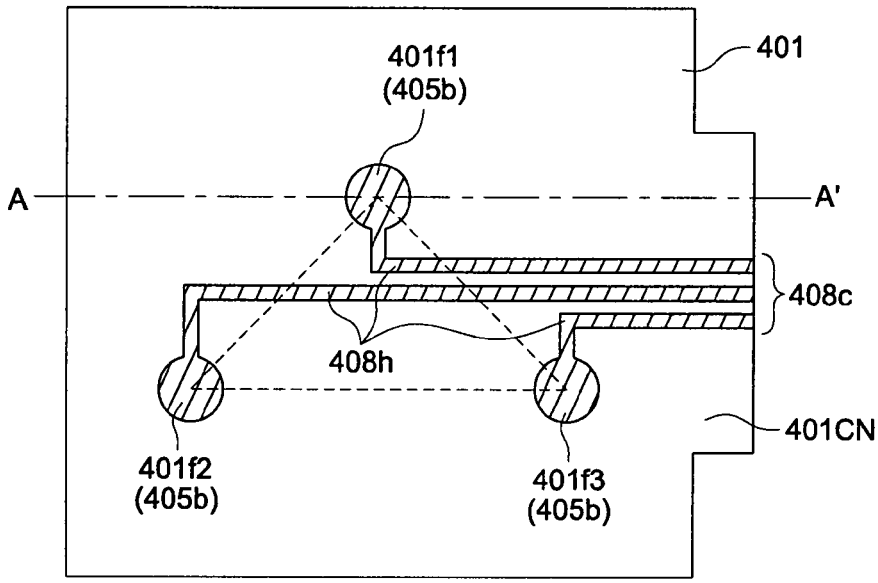
Figure 4:
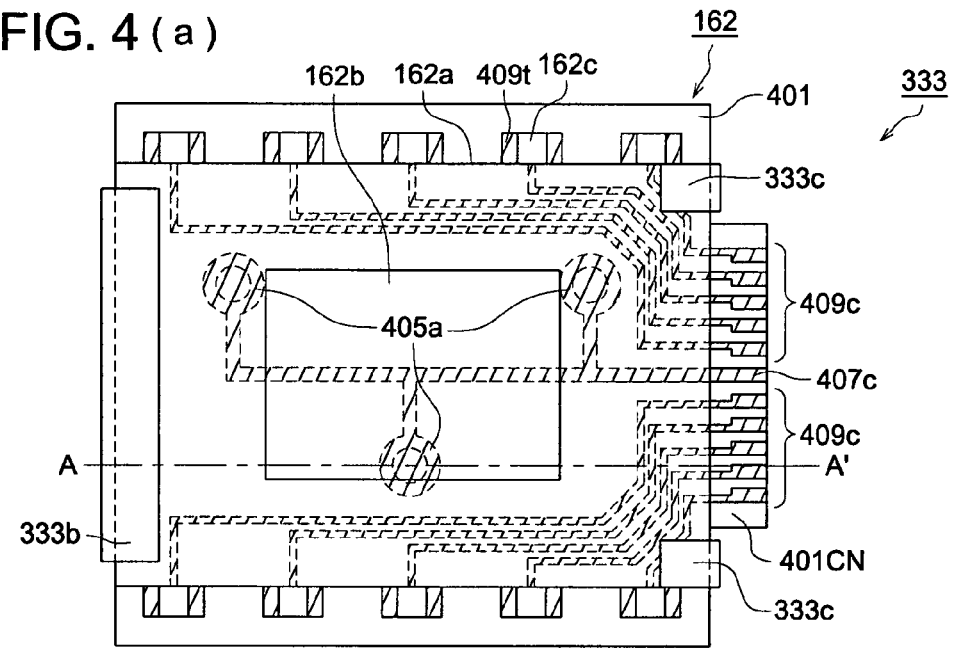
FIGS. 4(a), 4(b) and 4(c) are schematic diagrams representing the structure of a movable portion in a first embodiment.
Figure 4:
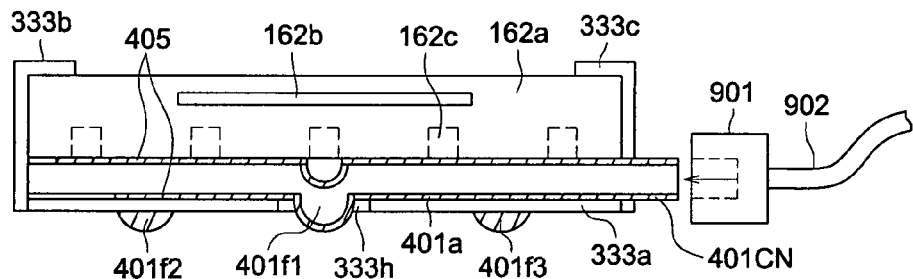
Figure 4:
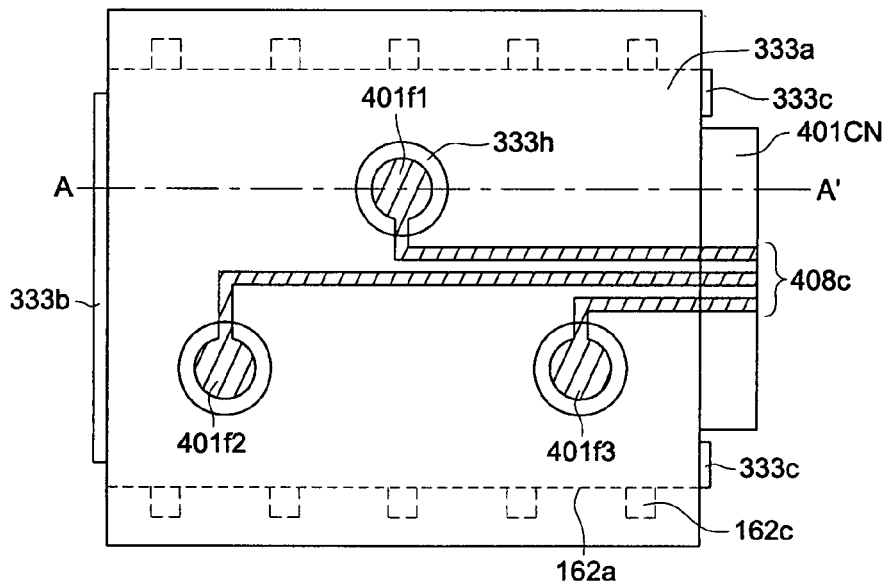

In the AF function, the contrast of the image picked up by the image pickup device 162 is calculated by the AF unit 167, and voltage is applied to the polymer actuator constituting the moving unit 331 by the actuator control unit 315 and drive circuit section 313 so that the size of the image contrast will be maximized, whereby the image pickup device 162 is moved toward the optical axis 200 (hereinafter referred to as "direction F"), and the pickup optical system 211 is focused. In this case, the AF unit 167 functions as a focus detection section of the present invention. The moving unit 331 will be described later with reference to FIGS. 3(a), 3(b) and 3(c), and thereafter.

Figure 2A:
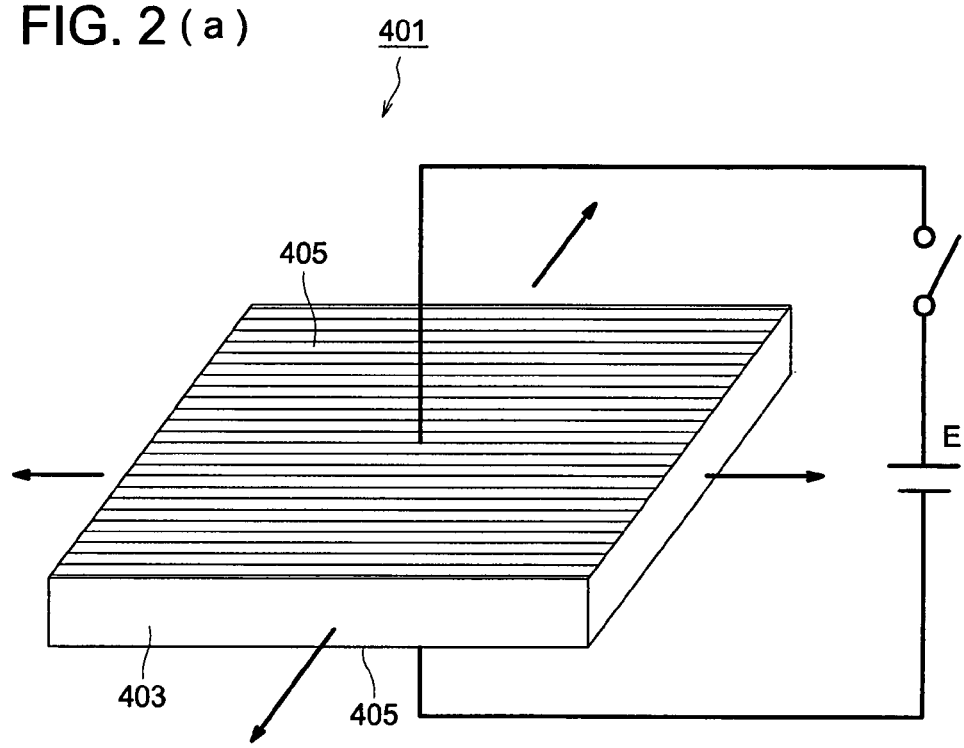
FIGS. 2(a) and 2(b) are schematic diagrams representing the operation principle of a polymer actuator.
Figure 2B:
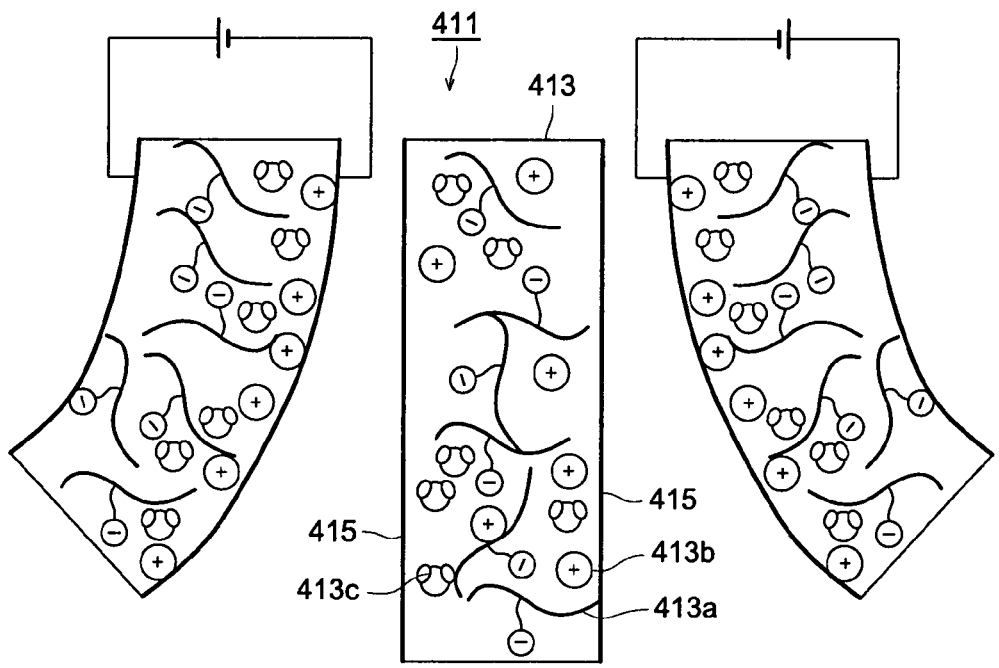

The following describes the operation principle of the polymer actuator used in the embodiment of the present invention with reference to FIGS. 2(a) and 2(b). FIGS. 2(a) and 2(b) are schematic diagrams representing the operation principle of a polymer actuator. FIG. 2(a) shows an example of the dielectric polymer type polymer actuator, while FIG. 2(b) indicates an example of the ion conductive type polymer actuator.

In FIG. 2(a), the dielectric polymer type polymer actuator 401 is formed of an elongation section 403 made of dielectric polymer (silicone resin and acryl based resin), and an electrode 405 of high molecular material mixed with a conductive carbon particles provided on both surfaces of the elongation section 403. When electric field E is applied between electrodes, static force of attraction occurs between the electrodes, and the electrodes are attracted by each other, with the result that the elongation section 403 made up of a dielectric polymer as an elastic body is elongated in the arrow-marked direction of the drawing. The magnitude of elongation depends approximately on the magnitude of the electric field to be applied.

If the electrode 405 is assumed as a partial electrode, only the elongation section 403 immediately below the partial electrode is elongated. Thus, when the electrode 405 is divided into a plurality of partial electrodes which are driven separately, it is possible to create the so-called actuator array wherein a plurality of polymer actuators are arranged. The polymer actuator can be formed in a desired shape because it is made of the resin characterized by greater force, lighter weight, minimized noise, and reduced electric power for driving.

In FIG. 2(b), the ion conductive type polymer actuator 411 is created by forming a gold electrode 415 on the both surfaces of the thin plate 413 made up of an ion exchange resin 413a by chemical plating. Positive ions 413b and polar molecules 413c are dispersed inside the ion exchange resin 413a, and positive ions 413b inside the ion exchange resin 413a are shifted toward the cathode by application of the electric field. Thus, a difference of swelling occurs on the front and rear of the thin plate, and causes bending. Accordingly, if the direction of the electric field is reversed, the direction of bending is also reversed.

In the first through third embodiments of the present invention, either the dielectric polymer type polymer actuator or ion conductive type polymer actuator can be used. The following description will be based on the dielectric polymer type polymer actuator alone. In the fourth and fifth embodiment, the dielectric polymer type polymer actuator can be utilized.

The following describes the first embodiment of the moving unit 331 using the aforementioned polymer actuator 401 with reference to FIG. 3(a) through FIG. 6. In this first embodiment shows an example of implementing the auto focus function by moving the image pickup device 162 in the direction F.

FIGS. 3(a), 3(b) and 3(c) are schematic diagrams representing the structure of the polymer actuator 401 in the first embodiment. FIG. 3(a) is a top view of the polymer actuator 401, and FIG. 3(b) is a cross sectional view taken along the arrow line A-A' FIG. 3(a) regarding the polymer actuator 401. FIG. 3(c) is a rear view of the polymer actuator 401.

In FIG. 3(a), the top surface of the polymer actuator 401 is provided with three partial electrode 405a of three displacement portions 401f1, 401f2 and 401f3, a connector terminal 407c for leading to the outside, and wiring 407h for connecting them into one integral form.

The portion other than the aforementioned three partial electrode 405a, a connector terminal 407c for leading to the outside, and wiring 407h for connecting them into one integral form is provided with ten lead patterns 409t connected with the lead terminals (here, image pickup devices 162 are assumed to have ten pins in the illustration) of the image pickup device 162, ten connector terminals 409c for leading to the outside, and ten pieces of wiring 409h for connecting them. A total of eleven connector terminals 407c and 409c are led to the connector 401CN.

In FIG. 3(b), three projecting displacement portions 401f1, 401f2 and 401f3 are integrally formed on the elongation section 403 of the polymer actuator 401. Electric field E is applied between the partial electrodes 405a and 405b arranged on both sides of the polymer actuator 401 so as to sandwich the displacement portions 401f1, 401f2 and 401f3, whereby projecting displacement portions 401f1, 401f2 and 401f3 are elongated in the direction marked by arrow in the drawing.

The generated force of the polymer actuator 401 depends on the static force, namely, the distance between the electrodes, and therefore, the front and rear of the three projecting displacement portions 401f1, 401f2 and 401f3 are formed in a concave shape so that uniform thickness of the displacement portions is ensured. For ease of explanation, only the partial electrodes 405a and 405b are illustrated. Other wiring portion viewable from the cross section is not illustrated.

In FIG. 3(c), on the front and back of the polymer actuator 401, three displacement portions 401f1, 401f2 and 401f3 are provided on each vertex of the isosceles triangle. There are three partial electrodes 405b of these three displacement portions 401f1, 401f2 and 401f3, three connector terminals 408c for leading to the outside, and three pieces of wiring 408h for connecting them. Three connector terminals 408c are led to the connector 401CN.

FIGS. 4(a), 4(b) and 4(c) are schematic diagrams representing the structure of the movable portion 333 constituting the moving unit 331. FIG. 4(a) is a top view and FIG. 4(b) is a cross sectional view taken along arrow line A-A' of FIG. 4(a). FIG. 4(c) is a rear view.

In FIG. 4(a), an image pickup device 162 is mounted on the surface on the side provided with a lead pattern 409t of the polymer actuator 401 explained with reference to FIGS. 3(a), 3(b) and 3(c), and lead terminal 162c of the image pickup device 162 is connected with the lead pattern 409t on the polymer actuator 401, for example, by a conductive adhesive, whereby the ten lead terminals 162c connected with the internal circuit of the image pickup device chip 162b constituting the image pickup device 162 are led to the connector 401CN. The partial electrode 405a of three displacement portions 401f1, 401f2 and 401f3 of the polymer actuator 401 is also led out to the connector 401CN as a connector terminal 407c.

In FIGS. 4(b) and 4(c), the polymer actuator 401 and image pickup device 162 are mounted on the frame 333a, and are sandwiched between the connecting portions 333b and 333c of the frame 333a and frame 333a. On the frame 333a, openings 333h are provided at the positions of three displacement portions 401f1, 401f2 and 401f3 of the polymer actuator 401 so that three displacement portions 401f1, 401f2 and 401f3 will project from the openings 333h.

The plane surface 401a of the polymer actuator 401 is sandwiched between the image pickup device package 162a and frame 333a so that it is not elongated even when electric field E is applied to the wiring portion located on the plane surface 401a. The connector 901 connected with the flexible circuit board 902, for example, is inserted into the connector 401CN and is electrically connected. It is connected with the image pickup device 162, polymer actuator 401 and image pickup circuit 300. The connector terminals 407c and 409c of the connector 401CN and the flexible circuit board 902 can be connected, for example, by a conductive adhesive.

Figure 5A:
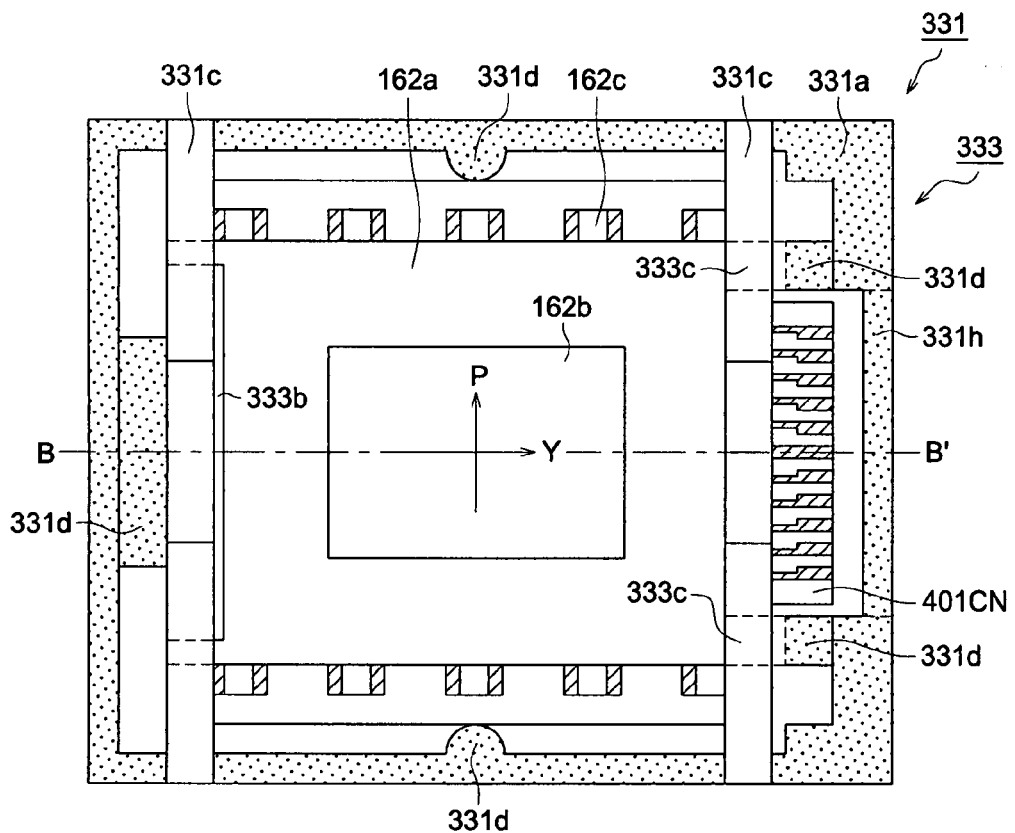
FIGS. 5(a) and 5(b) are schematic diagrams representing the structure of the first embodiment of a moving unit.
Figure 5B:
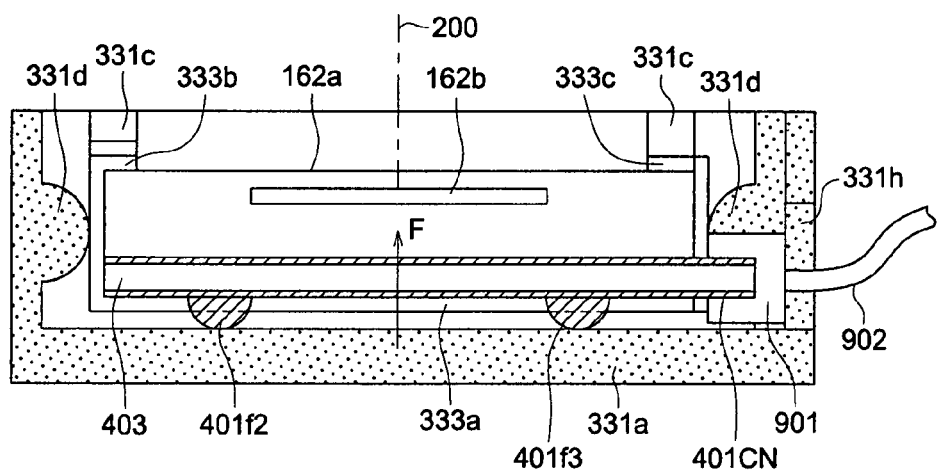

FIGS. 5(a) and 5(b) are schematic diagrams representing the structure of the first embodiment of a moving unit 331. FIG. 5(a) is a top view, FIG. 5(b) is a cross sectional view taken along the line B-B' of FIG. 5(a).

In FIG. 5(a), the movable portion 333 explained with reference to FIGS. 4(a), 4(b) and 4(c) is inserted into a stationary potion 331a and its movement in the directions P and Y is restricted by five projections 331d on the inner wall of the stationary potion 331a.

In FIG. 5(b), three displacement portions 401f1, 401f2 and 401f3 of the polymer actuator 401 constituting the movable portion 333 are kept in contact with the bottom surface of the stationary potion 331a. The movable portion 333 is energized in the direction −F by an bias spring 331c. Electric field E is applied between the partial electrodes 405a and 405b of the three displacement portions 401f1, 401f2 and 401f3 of the polymer actuator 401, whereby three displacement portions 401f1, 401f2 and 401f3 are elongated and movable portion 333 is moved in the direction of the optical axis 200, namely, in the direction F against the force of the bias spring 331c.

The portion facing the connector 401CN of the movable portion 333 of the stationary potion 331a is provided with an opening 331h, in which a connector 901 connected with the flexible substrate 902, for example, is inserted so that electrical connection with the connector 401CN is established.

Figure 6:
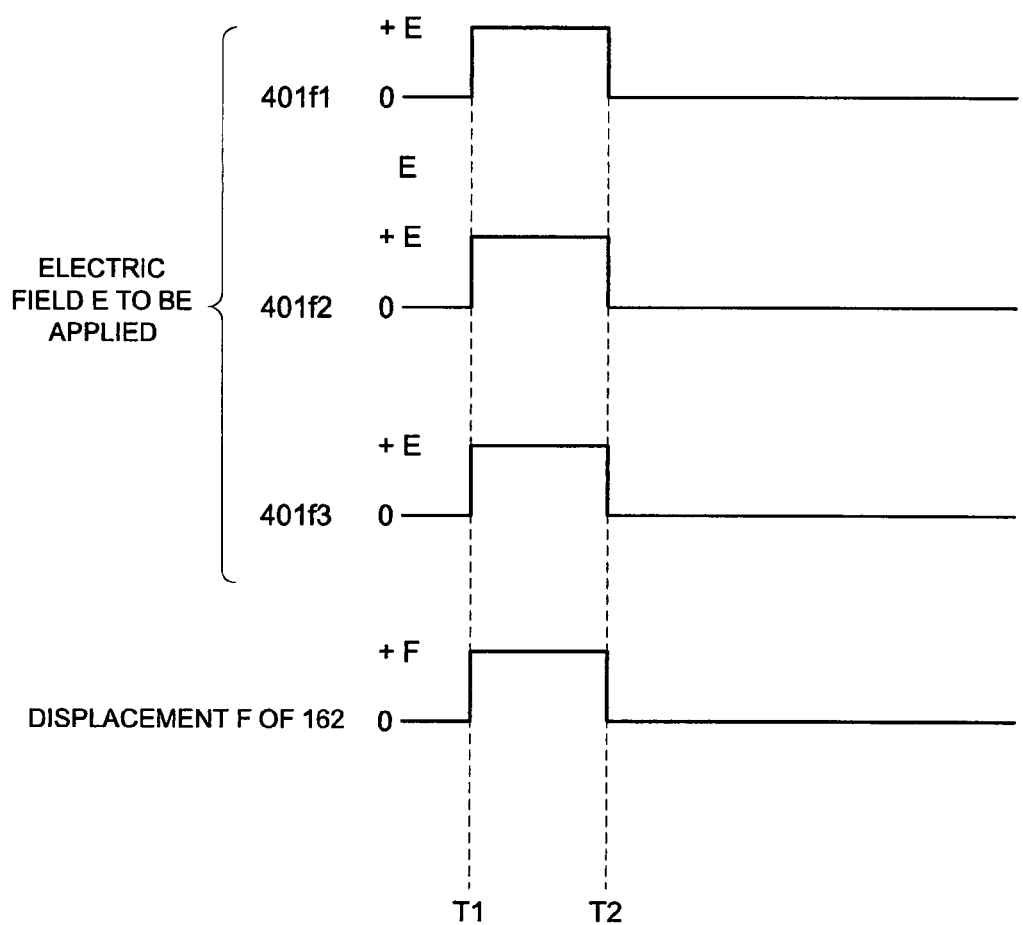
FIG. 6 is a timing chart showing relationship between the electric field applied to the polymer actuator and displacement of the image pickup device in the first embodiment.

FIG. 6 is a timing chart showing relationship between the electric field E applied to three displacement portions 401f1, 401f2 and 401f3, and displacement of the image pickup device 162 in the direction F.

In FIG. 6, when electric field +E is applied to the three displacement portions 401f1, 401f2 and 401f3 at timing T1, three displacement portions 401f1, 401f2 and 401f3 are elongated against the bias force of the bias spring 331c, and the image pickup device package 162a of the image pickup device 162 is pushed in the direction +F. The image pickup device 162 is displaced in the direction +F.

Similarly, when the electric field applied to the three displacement portions 401f1, 401f2 and 401f3 at timing T2 has been removed, three displacement portions 401f1, 401f2 and 401f3 having been elongated get back to the original state. The image pickup device package 162a of the image pickup device 162 is pushed back in the direction −F by the bias force of the bias spring 331c, and the image pickup device 162 is displaced in the direction −F to get back to the original position.

Fine control of each of the electric field E applied to the three displacement portions 401f1, 401f2 and 401f3 permits correction of the gradient of the image pickup surface of the image pickup device 162 with reference to the optical axis 200. Further, the special effect of tilt photographing can be achieved by tilting the image surface with a gradient given thereto.

As described above, according to this first embodiment, a polymer actuator 401 is provided to perform the auto focus function by moving the image pickup device 162 in the direction of the optical axis 200. Wiring of the terminal of the image pickup device 162 is provided on the position other than the displacement portion of the polymer actuator 401, thereby eliminating the need of a circuit board for mounting the image pickup device on the movable portion 333, and achieving reduction in the size, weight and cost of the moving unit 331.

Further, the polymer actuator 401 permits integral formation of the three displacement portions 401f1, 401f2 and 401f3, and can be installed in a very small space between the image pickup device 162 and the retaining section 331a of the moving unit 331. This arrangement ensures an efficient use of space, and very simple control because driving can be achieved merely by application of electric field.

Referring to FIG. 7(a) through FIG. 9, the following describes the second embodiment of the moving unit 331 using the polymer actuator 401. This second embodiment provides an example of moving the image pickup device 162 in the directions P and Y, thereby performing the image shake correction function.

Figure 7A:
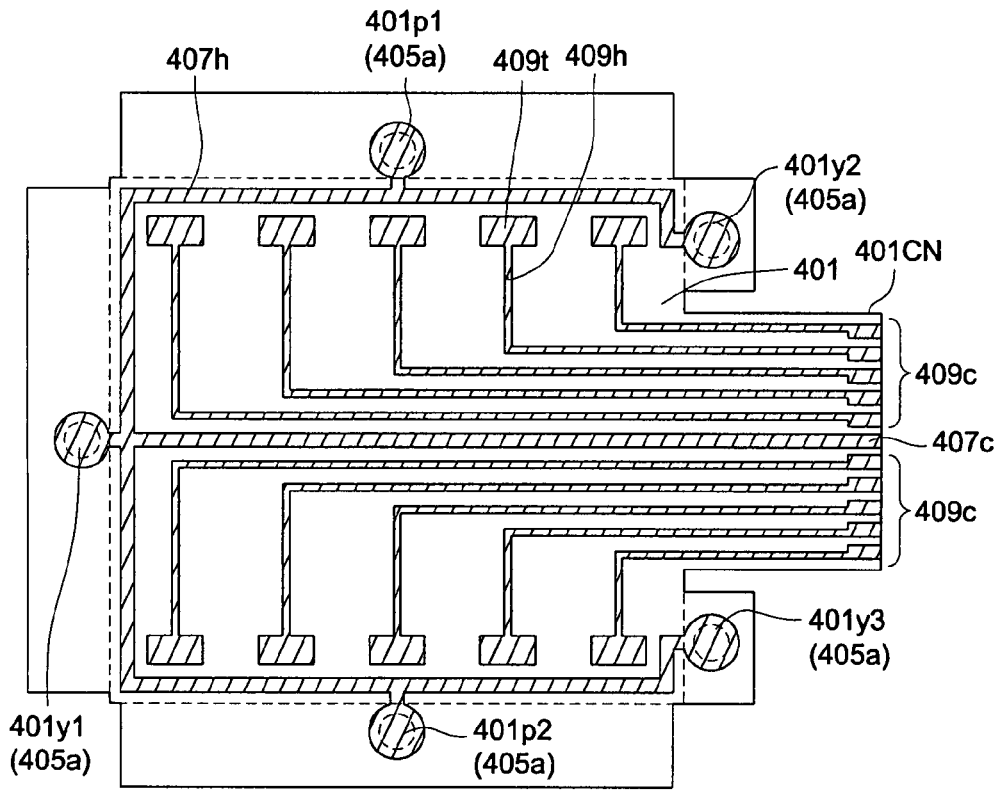
FIGS. 7(a) and 7(b) are schematic diagrams representing the structure of the polymer actuator in a second embodiment.
Figure 7B:
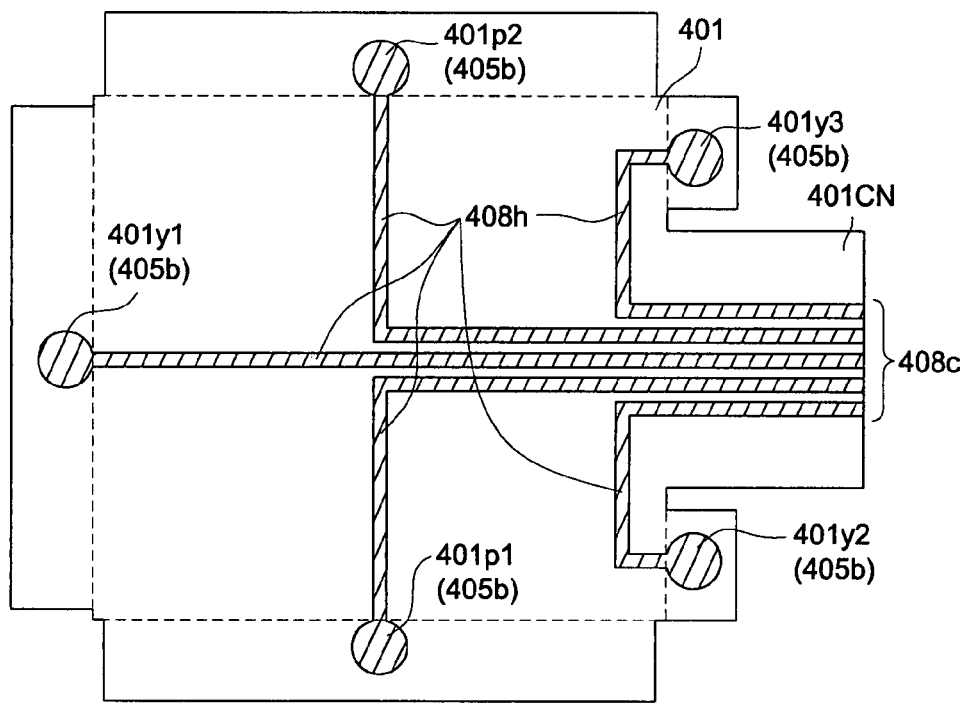

FIGS. 7(a) and 7(b) are schematic diagrams representing the structure of the polymer actuator 401 used in a second embodiment of the moving unit 331. FIG. 7(a) is a top view of the polymer actuator 401, and FIG. 7(b) is a rear view of the polymer actuator 401.

In FIG. 7(a), similarly to FIG. 3(a), the top surface of the polymer actuator 401 is provided with five partial electrodes 405a of the five displacement portions 401p1, 401p2, 401y1, 401y2 and 401y3, the connector terminal 407c for leading to the outside, and the wiring 407h for connecting them into an integral form. Similarly to the case of FIG. 3(b), five displacement portions are kept in a concave form to ensure uniform thickness in displacements.

The portion other than the aforementioned five partial electrodes 405a, a connector terminal 407c for leading to the outside, and wiring 407h for connecting them into one integral form is provided with ten lead patterns 409t connected with the lead terminals (here, image pickup devices 162 are assumed to have ten pins in the illustration) of the image pickup device 162, ten connector terminals 409c for leading to the outside, and ten pieces of wiring 409h for connecting them. A total of eleven connector terminals 407c and 409c are led to the connector 401CN.

At the portion indicated by a broken line in the drawing, the circumference of the polymer actuator 401 is bent toward the lead pattern 409t, and a box form is shaped in such a way that the connector 401CN is projected out toward the right in the drawing.

In FIG. 7(b), similarly to the case of FIG. 3(c), five displacement portions 401p1, 401p2, 401y1, 401y2 and 401y3 are provided on the portion constituting the side surface of the box form when bent at the portion indicated by a broken line in the drawing, on the rear surface of the polymer actuator 401. Five partial electrodes 405b of the five displacement portions 401p1, 401p2, 401y1, 401y2 and 401y3, five connector terminals 408c for leading to the outside, and five pieces of wirings 408h for connecting them are provided, and five connector terminals 408c are led to the connector 401CN.

Figure 8:
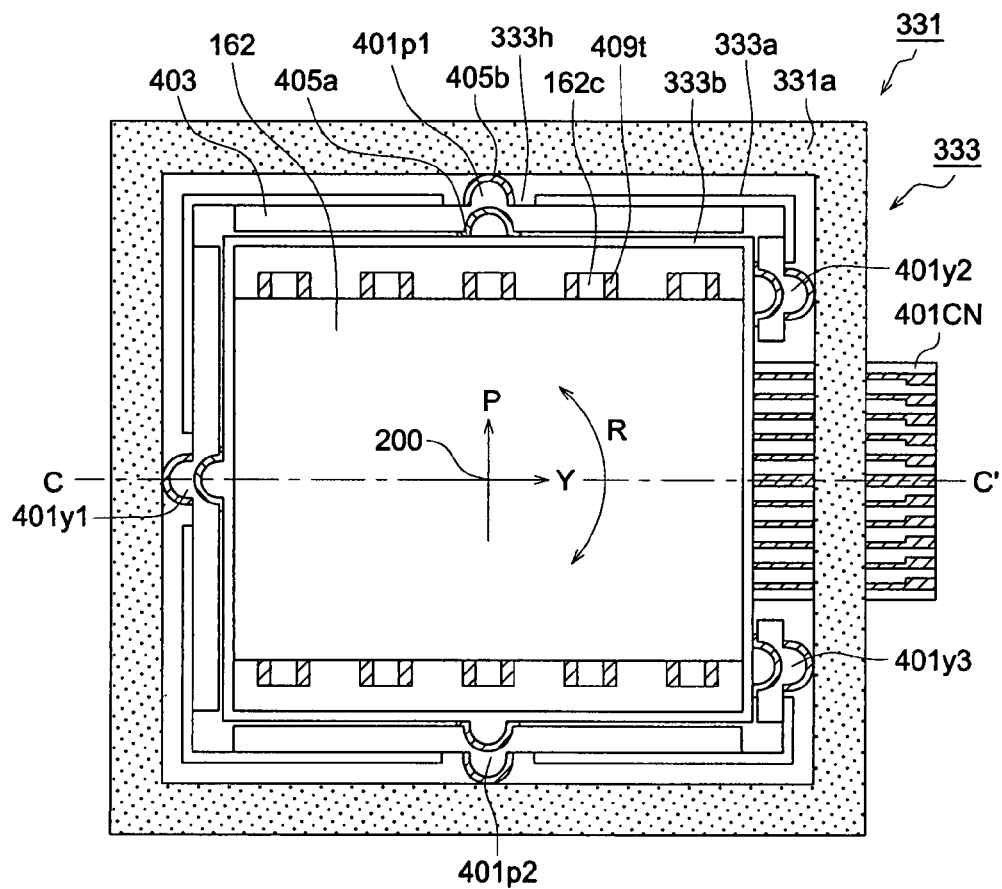
FIGS. 8(a) and 8(b) are schematic diagrams representing the structure of the second embodiment of the moving unit.
Figure 8:
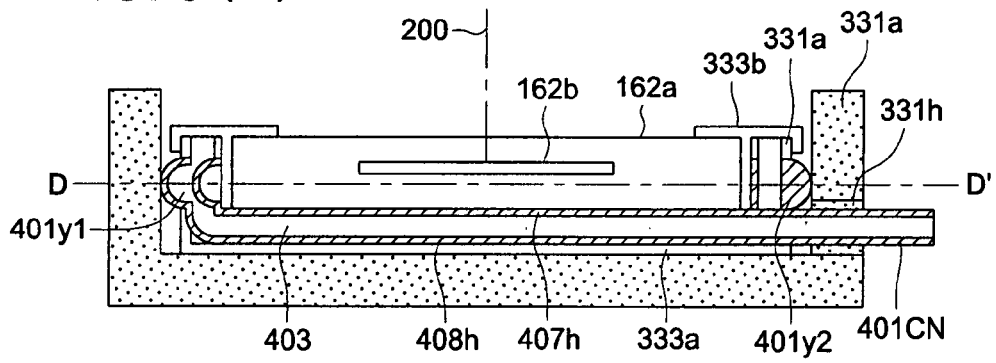

FIGS. 8(a) and 8(b) are schematic diagrams representing the structure of the second embodiment of the moving unit 331. FIG. 8(a) is a cross sectional view taken along the arrow line D-D' of FIG. 8(b). FIG. 8 (b) is a cross sectional view taken along the arrow line C-C' of FIG. 8 (a).

In FIG. 8(a), the movable portion 333 constituting the moving unit 331 is inserted inside the stationary potion 331a. The polymer actuator 401 constituting the movable portion 333 is bent by the broken line shown in FIG. 7(a), and is inserted into the frame 333a constituting the movable portion. It is inserted between the frame 333a and the regulating member 333b fixed on the frame 333a. The image pickup device 162 is inserted into the regulating member 333b, and the lead terminals 162c are connected to the lead patterns 409t of the polymer actuator 401, for example, by a conductive adhesive. Ten lead terminals 162c of the image pickup device 162 are led out to the connector 401CN.

Five displacement portions 401p1, 401p2, 401y1, 401y2 and 401y3 of the polymer actuator 401 are projected outwardly of the movable portion 333 through the openings 333h of the frame 333a, and are kept in contact with the inner wall of the stationary potion 331a. The image pickup device 162 is moved in the directions P and Y, or is rotated around the optical axis 200 (hereinafter referred to as "R") by controlling the electric field of the five displacement portions 401p1, 401p2, 401y1, 401y2 and 401y3.

The operation in the direction R will be described below. Elongation occurs when electric field E is applied to the displacement portion 401y2 on the upper right, without electric field being applied to the displacement portion 401y1 on the left and the displacement portion 401y3 on the lower right, out of the three displacement portions, for example, in the direction Y of FIG. 8(a). This causes the movable portion 333 to receive the leftward force from the right top of the drawing from the displacement portion 401y2, and to rotate in the counterclockwise direction of the drawing. In this case, the displacement portion 401y1 on the left and the displacement portion 401y3 on the lower right is subjected to deformation as a result of the counterclockwise rotation of the movable portion 333.

In FIG. 8(b), the bottom surface of the frame 333a is in contact with the inner surface of the bottom of the stationary potion 331a. The portion of the stationary potion 331a which is facing the connector 401CN of the movable portion 333 is provided with an opening 331h. Similarly to the case of FIGS. 5(a) and 5(b), the connector 901 connected with a flexible circuit board 902 (not illustrated), for example, is inserted in position, and electrical connection is established with the connector 401CN.

Figure 9:
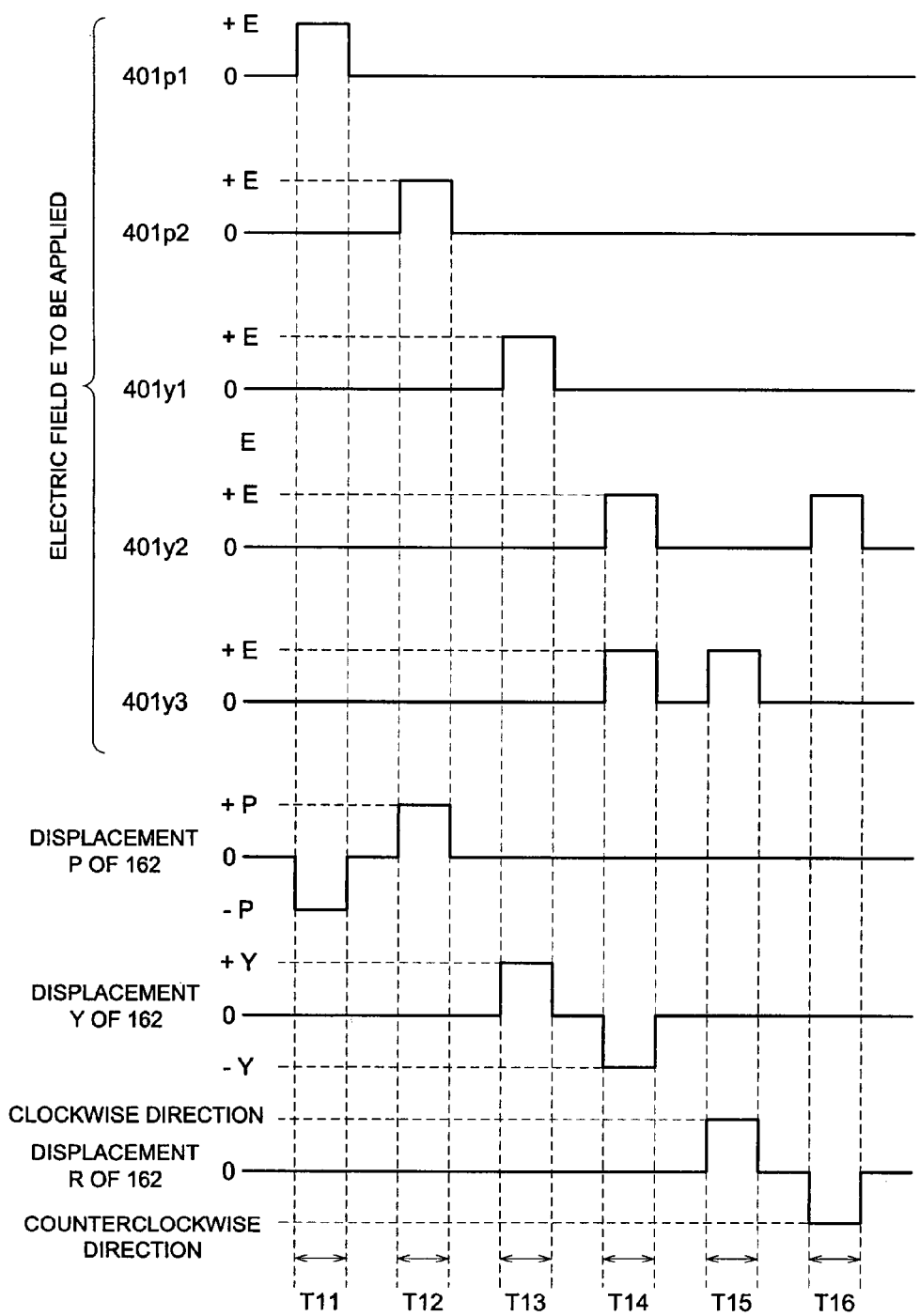
FIG. 9 is a timing chart showing relationship between the electric field applied to the polymer actuator and displacement of the image pickup device in the second embodiment.

FIG. 9 is a timing chart showing the relationship among the electric field E applied to the aforementioned five displacement portions 401p1, 401p2, 401y1, 401y2 and 401y3, the displacement of the image pickup device 162 in the directions P and Y, and the rotation in the direction R.

In FIG. 9, electric field E is applied to the displacement 401p1 in the direction P at timing T11, whereby the image pickup device 162 moves in the direction –P. The electric-field E is applied to the displacement 401p2 in the direction P at timing T12, whereby the image pickup device 162 moves in the direction +P.

The electric field E is applied to the displacement 401y1 in the direction Y at timing T13, whereby the image pickup device 162 moves in the direction +Y. The electric field E is applied to the displacement portions 401y2 and 401y3 in the direction Y at timing T14, whereby the image pickup device 162 moves in the direction –Y.

The electric field E is applied to the displacement 401y3 in the direction Y at timing T15, whereby the image pickup device 162 rotates counterclockwise in the direction R. The electric field E is applied to the displacement 401y2 in the direction Y at timing T16, whereby the image pickup device 162 rotates counterclockwise in the direction R.

As described above, according to this second embodiment, a polymer actuator 401 is provided to perform the image shake correction function by moving the image pickup device 162 within the surface vertical to the optical axis 200. Wiring of the terminal of the image pickup device 162 is provided on the position other than the displacement portion of the polymer actuator 401, thereby eliminating the need of using a circuit board for mounting the image pickup device on the movable portion 333, and achieving reduction in the size, weight and cost of the moving unit 331.

Further, the polymer actuator 401 permits integral formation of five displacement portions 401p1, 401p2, 401y1, 401y2 and 401y3 and can be installed in a very small space between the image pickup device 162 and the retaining section 331a of the moving unit 331. This arrangement ensures efficient use of space, and very simple control because driving can be achieved merely by application of electric field.

Figure 10:
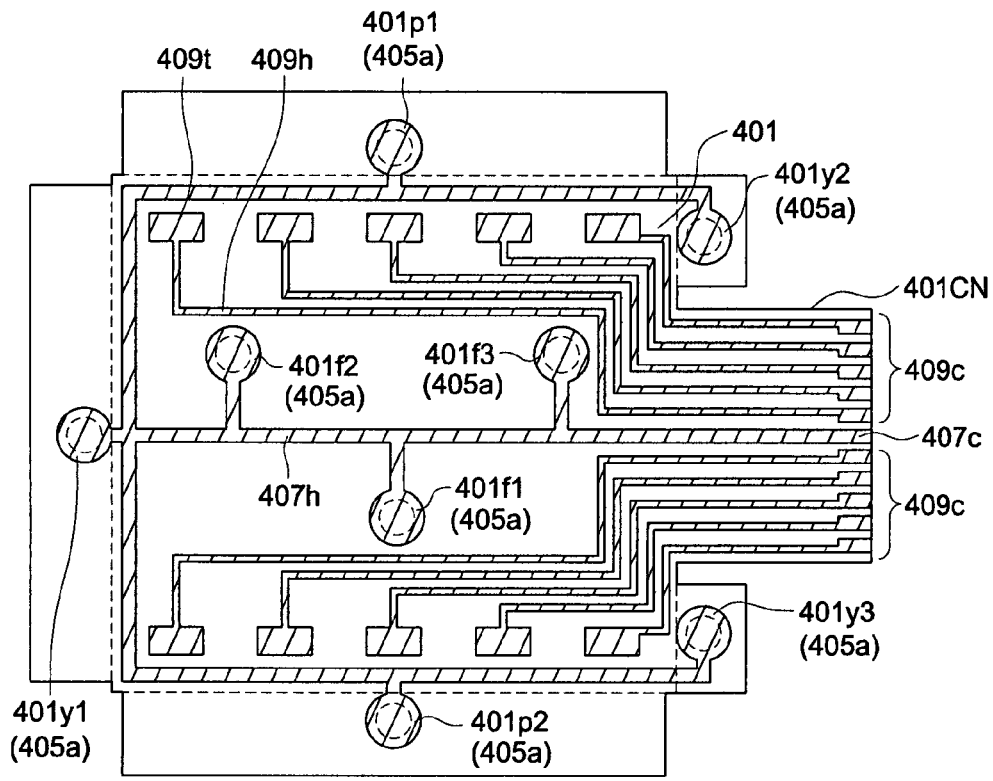
FIGS. 10(a) and 10(b) are schematic diagrams representing the structure of the polymer actuator in a third embodiment.
Figure 10:
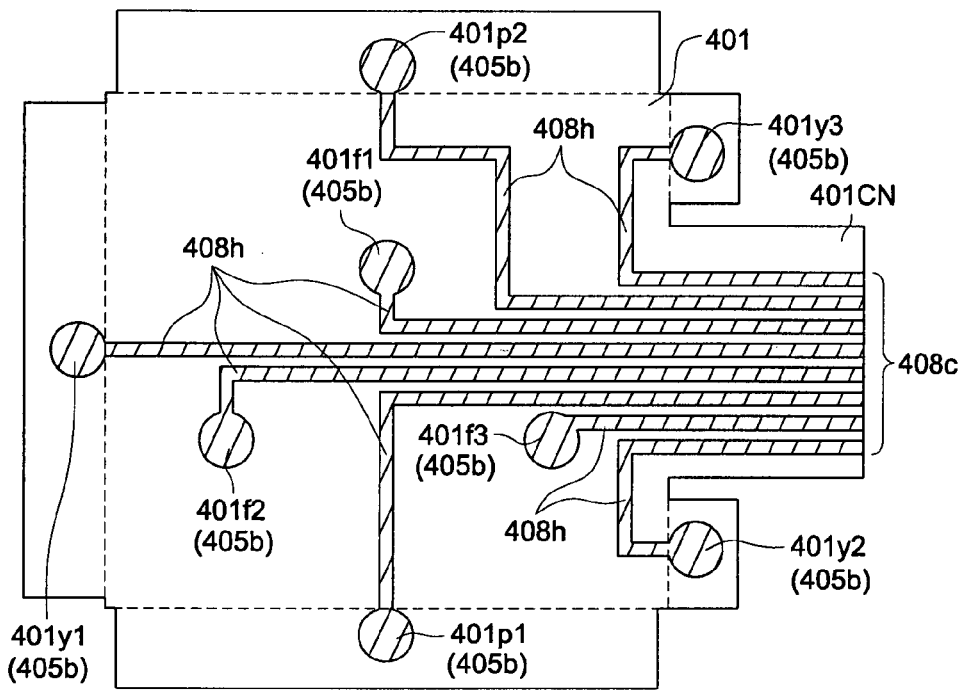
Figure 11:
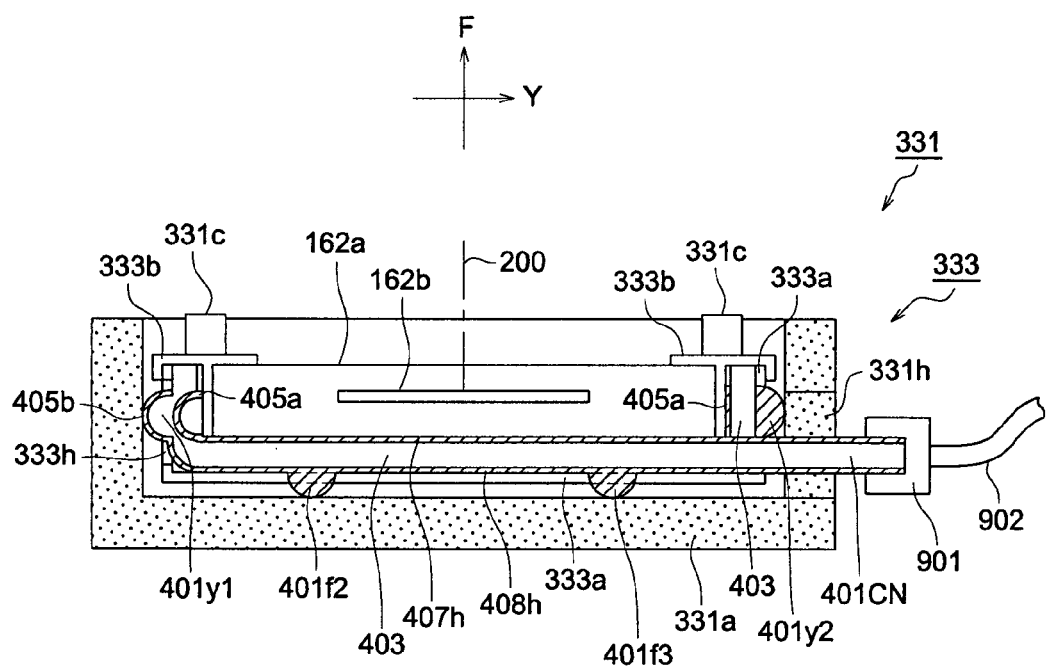
FIG. 11 is a schematic diagram representing the structure of the third embodiment of the moving unit.

The following describes the third embodiment of the moving unit 331 using the polymer actuator 401 with reference to FIG. 10(a), FIG. 10(b) and FIG. 11, In this third embodiment, image shake correction function and auto focus function are performed by moving the image pickup device 162 in the directions P, Y and F. To be more specific, this embodiment provides an example of compatibility between the first embodiment and the second embodiment.

FIGS. 10(a) and 10(b) are schematic diagrams representing the structure of the polymer actuator 401 used in the third embodiment of the moving unit 331. FIG. 10(a) is a top view of the polymer actuator 401, and FIG. 10(b) is a rear view of the polymer actuator 401.

In FIG. 10(a), the top surface of the polymer actuator 401 is provided with the partial electrodes 405a of the eight displacement portions 401f1, 401f2 and 401f3, 401p1, 401p2, 401y1, 401y2 and 401y3 of FIGS. 3(a), 3(b) and 3(c), and FIGS. 7(a) and 7(b), a connector terminal 407c for leading to the outside, and wiring 407h for connecting them into an integral form.

Similarly to the case of FIGS. 3(a), 3(b) and 3(c), and FIGS. 7(a), 7(b), ten lead patterns 409t connected with the lead terminals 162c of the image pickup device 162, ten connector terminals 409c for leading to the outside, and ten pieces of wirings 409h for connecting them are also provided. A total of eleven connector terminals 407c and 409c are led to the connector 401CN. Eight displacement portions are kept in a concave form to ensure uniform thickness in the displacement portions, as shown in FIG. 3(b).

In FIG. 10(b), eight displacement portions 401f1, 401f2, 401f3, 401p1, 401p2, 401y1, 401y2 and 401y3 of FIGS. 3(a), 3(b), 3(c), 7(a) and 7(b) are provided. Also eight partial electrodes 405b of these eight displacement portions 401f1, 401f2, 401f3, 401p1, 401p2, 401y1, 401y2 and 401y3, eight connector terminals 408c for leading to the outside, and eight pieces of wiring 408h for connecting them are provided. Eight connector terminals 408c are led out to the connector 401CN.

FIG. 11 is a schematic diagram representing the structure of the third embodiment of the moving unit 331. This is the same cross sectional view as a cross sectional view taken along the arrow line B-B' of FIG. 5(a) and a cross sectional view taken along the arrow line C-C' of FIG. 8(a).

In FIG. 11, eight displacement portions 401f1, 401f2, 401f3, 401p1, 401p2, 401y1, 401y2 and 401y3 of the polymer actuator 401 constituting the movable portion 333 protrude to the outside of the movable portion 333 from the openings 333*h* opened on the frame 333*a* constituting the movable portion 333. Three displacement portions 401*f*1, 401*f*2 and 401*f*3 in the direction F is kept in contact with the bottom surface of the stationary potion 331*a*, and five displacement portions 401*p*1, 401*p*2, 401*y*1, 401*y*2 and 401*y*3 in the directions P and Y are kept in contact with the inner wall of the stationary potion 331*a*.

The movable portion 333 is biased in the direction −F by the bias spring 331*c*. Electric field E is applied between the partial electrodes 405*a* and 405*b* of the three displacement portions 401*f*1, 401*f*2 and 401*f*3 in the direction F of the polymer actuator 401, whereby three displacement portions 401*f*1, 401*f*2 and 401*f*3 are elongated and the movable portion 333 is moved in the direction F against the bias force of the bias spring 331*c*. The method of driving the polymer actuator 401 is shown in FIG. 6.

Further, electric field F is applied between the partial electrodes 405*a* and 405*b* of the five displacement portions 401*p*1, 401*p*2, 401*y*1, 401*y*2 and 401*y*3 in the directions P and Y, whereby the image pickup device 162 is moved in the directions P and Y or is rotated around the optical axis 200 (hereinafter referred to as "R"). The polymer actuator 401 is driven as shown in FIG. 9.

The portion of the stationary potion 331*a* which is facing the connector 401CN of the movable portion 333 is provided with an opening 331*h*. The connector 901 connected with a flexible circuit board 902, for example, is inserted in position, and electrical connection is established with the connector 401CN.

As described above, according to this third embodiment, the polymer actuator 401 for achieving the auto focus function by moving the image pickup device 162 in the direction of the optical axis 200 is integrally formed with the polymer actuator 401 for achieving the image shake correction function by moving the image pickup device 162 within the surface vertical to the optical axis 200. At the same time, wiring of the terminal of the image pickup device 162 is provided on the position other than the displacement portion of the polymer actuator 401, thereby eliminating the need of using a circuit board for mounting the image pickup device on the movable portion 333, and achieving reduction in the size, weight and cost of the moving unit 331.

Further, the polymer actuator 401 can be installed in a very small space between the image pickup device 162 and the retaining section 331*a* of the moving unit 331. This arrangement ensures an efficient use of space, and very simple control because driving can be achieved merely by application of electric field.

Figure 12:
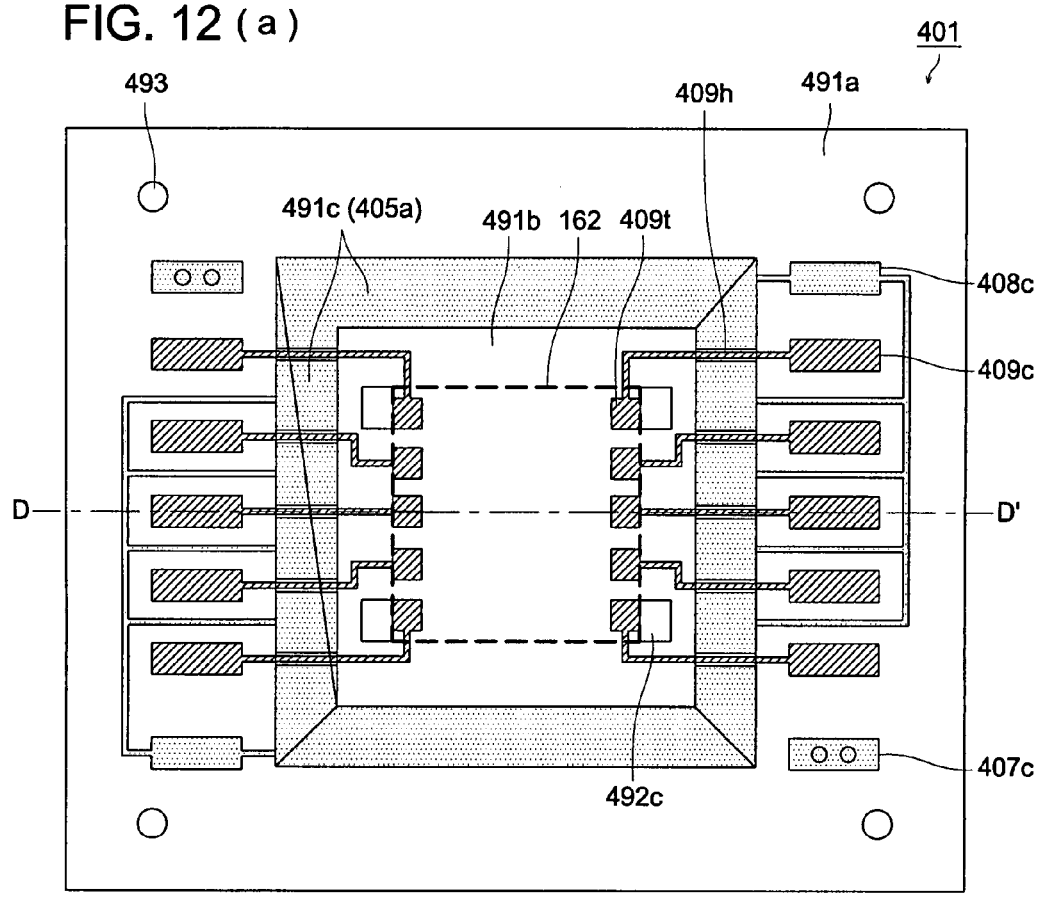
FIGS. 12(a), 12(b) and 12(c) are schematic diagrams representing the structure of the polymer actuator in a fourth embodiment.
Figure 12:
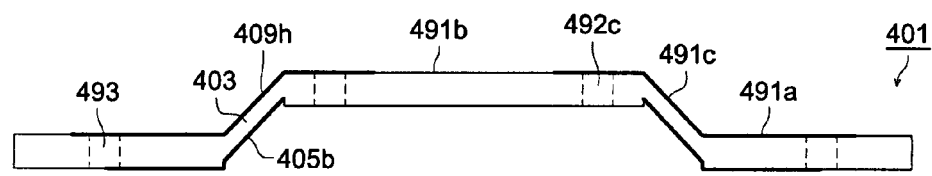
Figure 12:
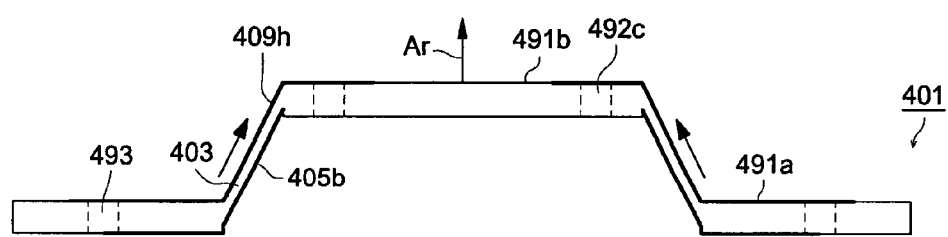

The following describes the fourth embodiment of the moving unit 331 using the polymer actuator 401 with reference to FIGS. 12(*a*), 12(*b*), 12(*c*), 13(*a*), 13(*b*) and 13(*c*). The fourth embodiment shows an example of performing the auto focus function by moving the image pickup device 162 in the direction F.

FIGS. 12(*a*), 12(*b*) and 12(*c*) are schematic diagrams representing the structure of the polymer actuator 401 in the fourth embodiment. FIG. 12(*a*) is a top view of the polymer actuator 401, and FIGS. 12(*b*) and 12(*c*) are the cross sectional view taken along the arrow line D-D' of FIG. 12(*a*) of the polymer actuator 401. FIG. 12(*b*) shows situation in which the electric field is not applied between the electrodes, while FIG. 12(*c*) shows the situation in which electric field is applied.

In FIG. 12(*a*), the polymer actuator 401 is made up of a surrounding flat portion 491*a*, a trapezoidal top portion 491*b* on the central portion raised in a trapezoidal form, and sloping portion 491*c*. Partial electrodes 405*a* and 405*b* are provided on both surfaces of the front and rear of the sloping portion 491*c*. The flat portion 491*a* and trapezoidal top portion 491*b* are not provided with the partial electrode 405*a* and 405*b*. Accordingly, the flat portion 491*a* and trapezoidal top portion 491*b* are not deformed by the application of electric field to the partial electrodes 405*a* and 405*b*, and does not function as an actuator.

The lead patterns 409*t* connected with the lead terminals 162*c* of the image pickup device 162 are provided on the trapezoidal surface side of the trapezoidal top portion 491*b* in this example. Further, the trapezoidal top portion 491*b* is provided with four through-hole 492*c* for allowing passage of the pressure contact member 492 (to be described later) for establishing electrical connection between the lead terminal 162*c* and lead pattern 409*t* by securing the image pickup device 162 on the trapezoidal top portion 491*b*, in this example.

The trapezoidal surface of the sloping portion 491*c* is provided with ten pieces of wirings 409*h* for connecting the lead patterns 409*t* with the connector terminals 409*c*. Except for the space that allows passage of the wiring 409*h*, partial electrode 405*a* is provided leaving the minimum space for avoiding contact with the wiring 409*h*. The partial electrode 405*b* is provided on the trapezoidal rear surface of the sloping portion 491*c* to cover the entire sloping surface. In this example, ten pieces of wirings 409*h* are arranged only on the sloping portion 491*c* on the right and left of the drawing, but they can be arranged in the form distributed in all directions. The portion sandwiched between the partial electrodes 405*a* and 405*b* of the sloping portion 491*c* corresponds to the displacement portion of the present invention.

The front surface of the flat portion 491*a* in the drawing is provided with ten connector terminals 409*c* connected with the lead patterns 409*t*, wiring 408*h* for connecting the partial electrode 405*a* on the sloping portion 491*c*, two connector terminals 408*c* connected thereto, and two connector terminals 407*c* connected to the partial electrode 405*b* on the trapezoidal rear of the sloping portion 491*c*. The partial electrode 405*b* and connector terminal 407*c* are connected by the through-hole arranged, for example, in the flat portion 491*a*. In this example, two connector terminals 407*c* connected with the partial electrode 405*b* are used, but one connector terminals 407*c* is sufficient from the viewpoint of structure.

The flat portion 491*a* is provided with four set screw holes 493 to connect the connector terminals 409*c*, 408*c* and 407*c*, and the flexible circuit board 902 (to be described later) in this example.

In FIG. 12(*b*), the sloping portion 491*c* is a hinge portion linking a flat portion 491*a* with a trapezoidal top portion 491*b*, and the partial electrodes 405*a* and 405*b* are provided on both surfaces of the front and rear. When electric field is applied between the partial electrodes 405*a* and 405*b*, the partial electrodes 405*a* and 405*b* attract each other, and the elongation sections 403 between the electrodes are deformed, whereby the sloping portion 491*c* elongates. As a result, the trapezoidal top portion 491*b* is pushed up from the flat portion 491*a* in the direction of the arrow mark Ar in the drawing, as shown in FIG. 12(*c*).

In this case, the partial electrodes 405*a* and 405*b* and wiring 409*h* are made up of the high molecular material mixed with the same conductive carbon particle as that of the polymer actuator 401, and are elongated in response to the elongation of the sloping portion 491*c*. This arrangement eliminates the possibility of wire disconnection.

Figure 13A:
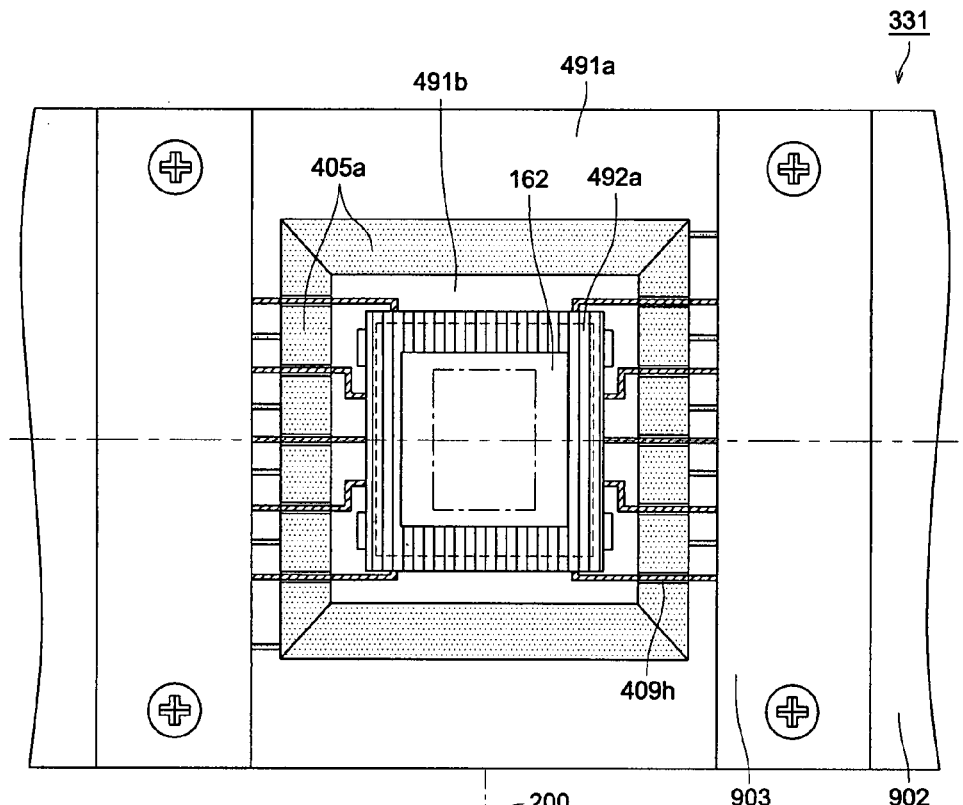
FIGS. 13(a), 13(b) and 13(c) are schematic diagrams representing the structure of the fourth embodiment of the moving unit.
Figure 13B:
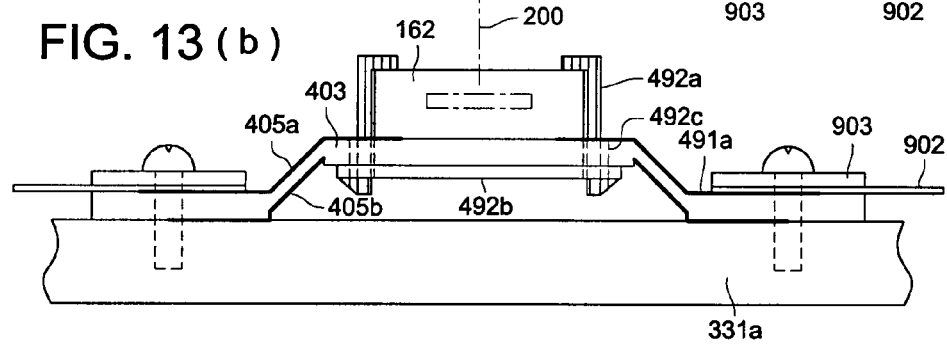
Figure 13C:
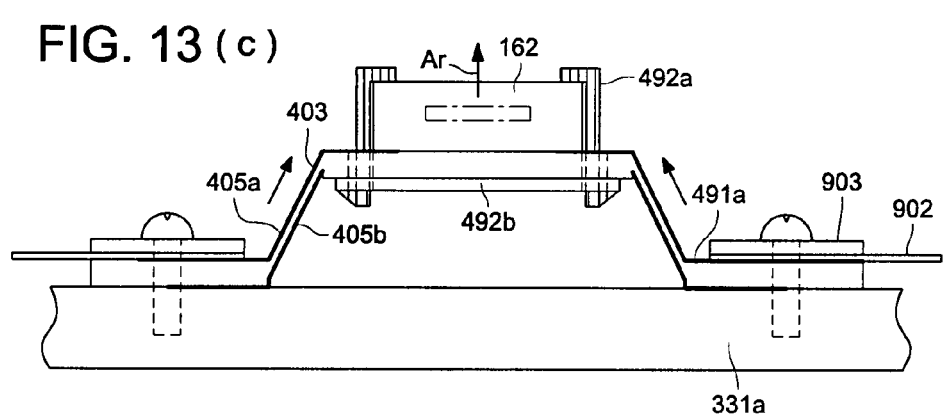

FIGS. 13(*a*), 13(*b*) and 13(*c*) are schematic diagrams representing the structure of the fourth embodiment of the moving unit 331. FIG. 13(*a*) is a top view of the moving unit 331, and FIGS. 13(b) and 13(c) are the cross sectional view taken along the arrow line E-E' of FIG. 13(a) of the moving unit 331. FIG. 13(b) shows the situation in which the electric field is not applied between the electrodes, while FIG. 13(c) shows the situation in which electric field is applied.

In FIG. 13(a), the image pickup device 162 is mounted on the trapezoidal top portion 491b of the polymer actuator 401 shown in FIGS. 12(a), 12(b) and 12(c), and is pressed from above by the pressure contact frame 492a of the pressure contact member 492. The connector terminals 409c, 408c and 407c on the flat portion 491a are connected with the flexible circuit board 902 by set screws through a pressure bonding plate 903.

In FIG. 13(b), a pressure contact plate 492b is placed in close contact with the trapezoidal rear of the trapezoidal top portion 491b. The claw on the front end of the pressure contact frame 492a reaches the rear surface of the pressure contact plate 492b through a through-hole 492c and a hole provided on the pressure contact plate 492b and is engaged to the pressure contact plate 492b so that the image pickup device 162 and trapezoidal top portion 491b are sandwiched between the pressure contact frame 492a and pressure contact plate 492b. This arrangement establishes electrical connection between the lead terminals 162c of the image pickup device 162 and the lead patterns 409t of the trapezoidal top portion 491b.

The connector terminals 409c, 408c and 407c on the flat portion 491a and the flexible substrate 902 are connected with the stationary potion 331a by set screws through a pressure bonding plate 903, and electrical connection is established between them.

When electric field is applied between the partial electrodes 405a and 405b arranged on the front and rear of the sloping portion 491c of the polymer actuator 401, the electrodes 405a and 405b attract each other, and the elongation sections 403 between the electrodes are deformed, whereby the sloping portion 491c elongates. As a result, the image pickup device 162 is pushed up from the flat portion 491a in the direction of the arrow mark Ar in the drawing, as shown in FIG. 13(c).

As described above, according to the fourth embodiment, a sloping portion 491c as a hinge portion is provided between the undeformable flat portion 491a and trapezoidal top portion 491b, and partial electrodes 405a and 405b are arranged on both surfaces of the front and rear of the sloping portion 491c. This allows the trapezoidal top portion 491b to be pushed up from the flat portion 491a by the electric field applied between the partial electrodes 405a and 405b. Thus, the image pickup device 162 is mounted on the trapezoidal top portion 491b, whereby the image pickup device 162 can be moved in the direction F, and hence the auto focus function can be implemented.

Further, the partial electrode 405a on the sloping portion 491c is partially notched, and wiring 409h for connection between the lead pattern 409t and connector terminal 409c is passed through the notched portion. This arrangement eliminates the need of using the circuit board for mounting the image pickup device on the trapezoidal top portion 491b, and achieves reduction in the size, weight and cost of the moving unit 331.

If the wiring 409h is routed on the sloping portion 491c, the portion where the wiring 409h is routed is not deformed when electric field is applied between the partial electrodes 405a and 405b. Thus, there is difference in deformation rate between the portion with the wiring 409h of the sloping portion 491c and the portion without it. Accordingly, when occurrence of inclination of the image pickup device involves a problem as in the present example, it is preferred to take measures as described in the embodiment in such a way that the wiring 409h is distributed on the surfaces of the both of the facing two sloping portions 491c, and the partial electrode 405a is provided on the sloping portion 491c between the wirings 409h.

The wiring 409h elongates in response to the elongation of the sloping portion 491c. Thus, resistance value is changed by the elongation of the sloping portion 491c. However, this change is very small, and does not affect the characteristics of the image pickup device 162.

The fifth embodiment of the moving unit 331 using the polymer actuator 401 will be described with reference to FIGS. 14(a), 14(b), 15(a), 15(b) and 15(c). In the fill light unit used in auto focus of the fifth embodiment, the fill light focusing function is accomplished by moving the light emitting device in the direction F.

Figure 14:
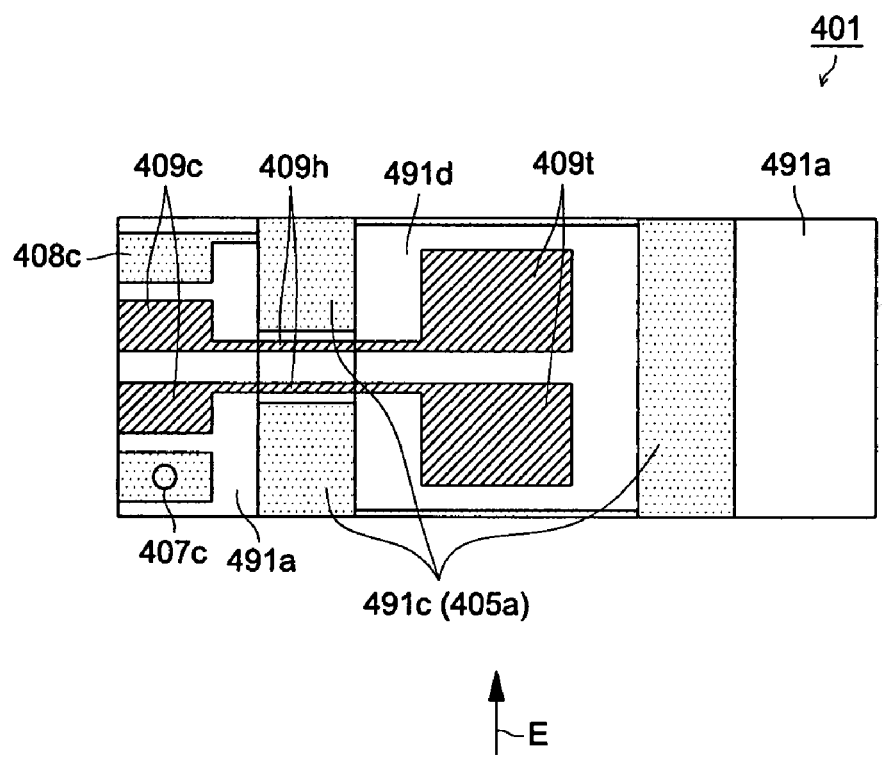
FIGS. 14(a) and 14(b) are schematic diagrams representing the structure of the polymer actuator in a fifth embodiment.
Figure 14:
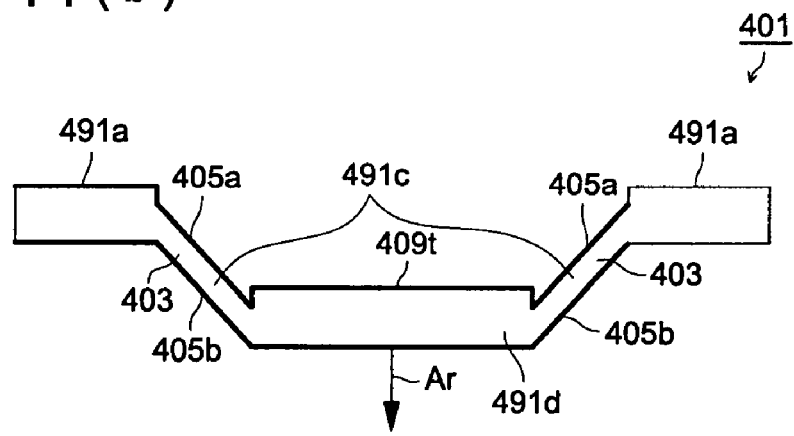

FIGS. 14(a) and 14(b) are schematic diagrams representing the structure of the polymer actuator 401 in the fifth embodiment. FIG. 14(a) is a pattern diagram showing the light emitting device installation surface of the polymer actuator 401. FIG. 14(b) is a side view of the polymer actuator 401 as viewed from the arrow-marked direction E of FIG. 14(a).

In FIG. 14(a), the polymer actuator 401 is made up of a surrounding flat portion 491a, a trapezoidal top portion 491d on the central portion sunken in a trapezoidal form, and sloping portion 491c. Differently from FIGS. 12(a), 12(b) and 12(c), the sloping portions 491c are provided only on the right and left sides of the drawing. Both surfaces of the front and rear of the sloping portion 491c are provided with the partial electrode 405a and 405b, respectively. The flat portion 491a and trapezoidal bottom 491d are not provided with partial electrodes 405a and 405b. Thus, flat portion 491a and trapezoidal bottom 491d are not deformed by the application of electric field to the partial electrodes 405a and 405b, and does not function as an actuator.

Two lead patterns 409t connected with the lead terminal of the light emitting device 998 (to be described later) are provided on the trapezoidal surface side of the trapezoidal top portion 491d in this example. Two pieces of wiring 409h for connection between the aforementioned lead pattern 409t and connector terminal 409c provided on the flat portion 491a are arranged on the light emitting device installation surface side of the sloping portion 491c.

A partial electrode 405a is arranged on the portion other than the space where the wiring 409h of the sloping portion 491c is routed. However, differently from FIG. 12(a), 12(b) and 12(c), a partial electrode 405a is not provided between two pieces of wirings 409h. A partial electrode 405b is provided on the rear of the light emitting device installation surface of the sloping portion 491c to cover the entire sloping surface. Two pieces of wirings 409h are collectively provided on the sloping portion 491c in the left direction of the drawing.

The light emitting device installation surface side of the flat portion 491a is provided with two connector terminals 409c connected with the lead pattern 409t, the connector terminal 408c connected with the partial electrode 405a on the sloping portion 491c, and the connector terminal 407c connected with the partial electrode 405b on the rear of the light emitting device installation surface of the sloping portion 491c. The partial electrode 405b and connector terminal 407c are connected, for example, by a through-hole arranged on the flat portion 491a.

In FIG. 14(b), the sloping portion 491c is a hinge portion linking a flat portion 491a with a trapezoidal top portion 491b, and the partial electrodes 405a and 405b are provided on both surfaces of the front and rear. When electric field is applied between the partial electrodes 405a and 405b, the partial electrodes 405a and 405b attract each other, and the elongation sections 403 between the electrodes are deformed, whereby the sloping portion 491c elongates. As a result, the trapezoidal top portion 491b is pushed down from the flat portion 491a in the direction of the arrow mark Ar in the drawing.

In this case, the partial electrodes 405a and 405b and wiring 409h are made up of the high molecular material mixed with the same conductive carbon particle as that of the polymer actuator 401, and are elongated in response to the elongation of the sloping portion 491c. This arrangement eliminates the possibility of wire disconnection.

Figure 15A:
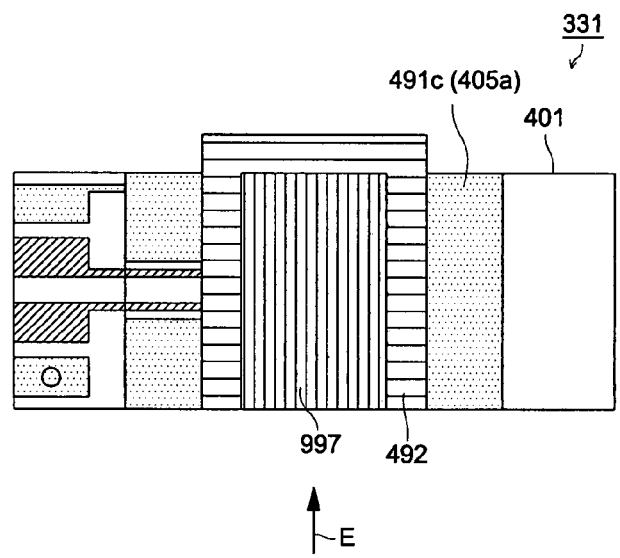
FIGS. 15(a), 15(b) and 15(c) are schematic diagrams representing the structure of the fifth embodiment of the moving unit.
Figure 15B:
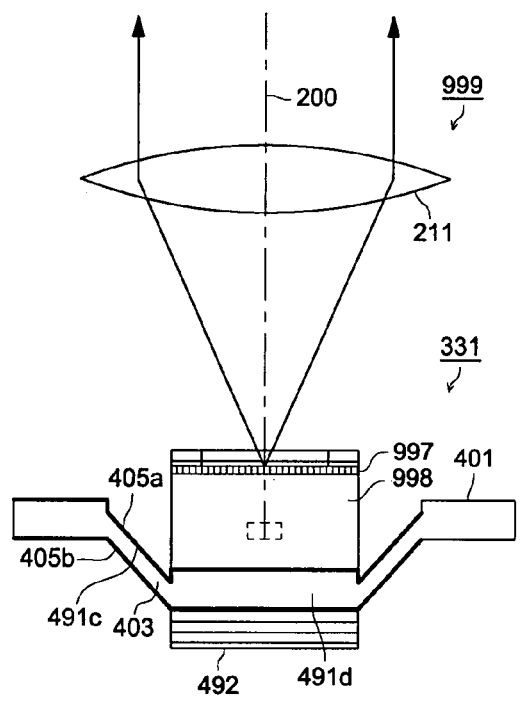
Figure 15C:
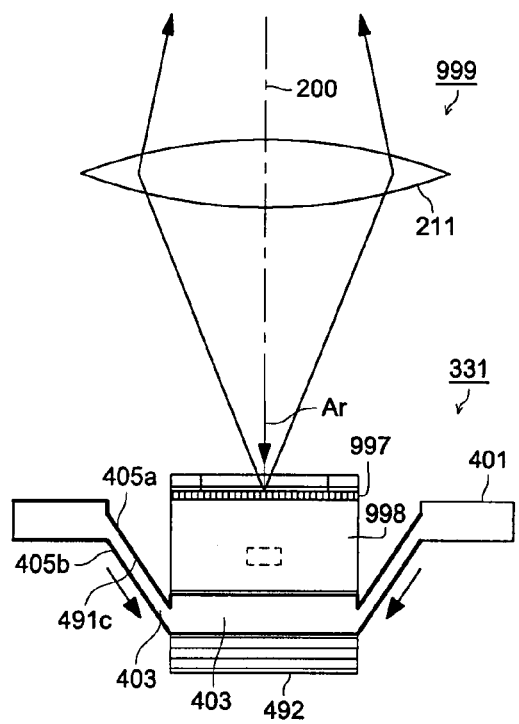

FIGS. 15(a), 15(b) and 15(c) are schematic diagrams representing the structure of the fifth embodiment of the moving unit 331. FIG. 15(a) is a drawing showing the light emitting device installation surface of the moving unit 331, and FIGS. 15(b) and 15(c) are the cross sectional view taken along the arrow line E of FIG. 15(a) of the moving unit 331. FIG. 15(b) shows the situation in which the electric field is not applied between the electrodes, while FIG. 15 (c) shows the situation in which electric field is applied.

In FIG. 15(a), a light emitting device 998 is installed on the trapezoidal bottom 491d of the polymer actuator 401 shown in FIGS. 14(a) and 14(b), and a pattern mask 997 is mounted on the light emitting device 998. The light emitting device 998 and pattern mask 997 are pressed against the trapezoidal bottom 491d by a pressure contact member 492 in such a way as to be sandwiched between clips. The connector terminals 409c, 408c and 407c on the flat portion 491a are connected with a flexible circuit board, for example, by a connector (not illustrated).

In FIG. 15(b), the fill light unit 999 includes a projecting lens 211, moving unit 331, light emitting device 998 and pattern mask 997. The light emitting device 998, pattern mask 997 and trapezoidal bottom 491d are sandwiched between pressure contact members 492. This arrangement establishes electrical connection between the lead terminals of the light emitting device 998 and the lead patterns 409t of the trapezoidal bottom 491d.

This allows the light emitting device 998 to serve as an illumination source which permits a pattern on the pattern mask 997 to be projected on the subject through the projecting lens 211, whereby a fill light at the time of auto focus is provided. In FIG. 15(b), electric field is not applied between the partial electrodes 405a and 405b. In this case, the pattern mask 997 is infinitely focused. In this case, the fill light unit 999, light emitting device 998 and projecting lens 211 are an optical unit, optical device and optical system, respectively.

When electric field is applied between the partial electrodes 405a and 405b installed on the front and rear of the sloping portion 491c of the polymer actuator 401, the partial electrodes 405a and 405b attract each other, and the elongation sections 403 between the electrodes are deformed, whereby the sloping portion 491c elongates. As a result, the light emitting device 997 is pushed down in the direction of the arrow mark Ar in FIG. 15(c). In this case, the pattern mask 997 is focused on the near distance side.

As described above, according to the fifth embodiment, a sloping portion 491c as a hinge portion is provided between the undeformable flat portion 491a and trapezoidal top portion 491b, and partial electrodes 405a and 405b are arranged on both surfaces of the front and rear of the sloping portion 491c. This allows the trapezoidal bottom 491d to be pushed down from the flat portion 491a by the electric field applied between the partial electrodes 405a and 405b. Thus, light emitting device 998 is mounted on the trapezoidal bottom 491d, whereby fill light can be emitted at the time of auto focus.

Further, the partial electrode 405a on the sloping portion 491c is partially notched, and wiring 409h for connection between the lead pattern 409t and connector terminal 409c is passed through the notched portion. This arrangement eliminates the need of using a circuit board for mounting the light emitting device 998 on the trapezoidal bottom 491d, and achieves reduction in the size, weight and cost of the moving unit 331.

Similarly to the case of the fourth embodiment, if the wiring 409h is routed on the sloping portion 491c, there is difference in deformation rate between the portion with the wiring 409h of the sloping portion 491c routed thereon, and the portion without it. Accordingly, when inclination of the light emitting device 998 does not raise a big problem as in the present example, wiring 409h can be concentrated on one surface of the sloping portion 491c, and a partial electrode 405a need not be installed on the sloping portion 491c between the wiring 409h.

The wiring 409h elongates in response to the elongation of the sloping portion 491c. Thus, resistance value is changed by the elongation of the sloping portion 491c. However, this change is very small, and does not affect the characteristics of the light emitting device 998.

As described above, the embodiment of the present invention provides an optical unit and image pickup apparatus characterized by easy assembling, compact configuration, high performance and reduced costs by using a polymer actuator to move the image pickup device for the purpose of performing auto focus function and image shake correction function, and by providing a polymer actuator with electric wiring of an image pickup device, thereby reducing the number of circuit board used for electric wiring of the image pickup device.

It is to be expressly understood that detailed structures and operations of the components constituting the optical unit and image pickup apparatus of the present invention can be embodied in a great number of variations with appropriate modifications or additions, without departing from the technological spirit and scope of the invention claimed.

What is claimed is:

1. An optical unit, comprising:
   an optical system;
   an optical device having lead terminals;
   a polymer actuator which is provided in contact with the optical device so as to move the optical device; and
   electrical interconnection patterns which are provided on a surface of the polymer actuator, wherein one of the lead terminals is connected to a first portion on one face of one of the electrical interconnection patterns, said first portion being located opposite to a second portion located on another face of the one of the electrical interconnection patterns that is held in contact with the surface of the polymer actuator,
   wherein the polymer actuator is disposed in contact with at least an opposite side of the optical device to an optical surface thereof, and the electrical interconnection patterns are provided on the surface of the polymer actuator which is in contact with the optical device.

2. The optical unit of claim 1, wherein the polymer actuator includes a displacement portion which deforms in response to an electric field applied thereto so as to move the optical device.

3. The optical unit of claim 2, wherein the electrical interconnection patterns are provided in contact with the surface of the polymer actuator only in a portion other than the displacement portion.

4. The optical unit of claim 1, wherein the optical device includes an image pickup device.

5. The optical unit of claim 1, wherein the optical device includes a light emitting device.

6. The optical unit of claim 2, wherein the displacement portion deforms in a direction away from the optical device.

7. An image pickup apparatus, comprising an optical unit; the optical unit including:
   an optical system;
   an image pickup device having lead terminals;
   a polymer actuator which is provided in contact with the image pickup device so as to move the image pickup device; and
   electrical interconnection patterns which are provided on a surface of the polymer actuator wherein one of the lead terminals is connected directly to a first portion on one face of one of the electrical interconnection patterns, said first portion being located opposite to a second portion located on another face of the one of the electrical interconnection patterns that is held in contact with the surface of the polymer actuator;
   a focus detection section which detects a focus condition of a subject image provided by the optical system; and
   a drive section which moves the image pickup device in a direction of an optical axis of the optical system based on a detection result of the focus detection section by means of the polymer actuator,
   wherein the polymer actuator is disposed in contact with at least an opposite side of the image pickup device to an optical surface thereof, and the electrical interconnection patterns are provided on the surface of the polymer actuator which is in contact with the image pickup device.

8. An image pickup apparatus, comprising an optical unit; the optical unit including:
   an optical system;
   an image pickup device having lead terminals;
   a polymer actuator which is provided in contact with the image pickup device so as to move the image pickup device; and
   electrical interconnection patterns which are provided on a surface of the polymer actuator, wherein one of the lead terminals is connected directly to a first portion on one face of one of the electrical interconnection patterns, said first portion being located opposite to a second portion located on another face of the one of the electrical interconnection patterns that is held in contact with the surface of the polymer actuator;
   a shake detection section which detects a shake of the optical unit; and a drive section which moves the image pickup device in a direction perpendicular to an optical axis of the optical system based on a detection result of the shake detection section by means of the polymer actuator,
   wherein the polymer actuator is disposed in contact with at least an opposite side of the image pickup device to an optical surface thereof, and the electrical interconnection patterns are provided on the surface of the polymer actuator which is in contact with the image pickup device.

9. An image pickup apparatus, comprising an optical unit; the optical unit including:
   an optical system;
   an image pickup device having lead terminals;
   a polymer actuator which is provided in contact with the image pickup device so as to move the image pickup device; and
   electrical interconnection patterns which are provided on a surface of the polymer actuator, wherein one of the lead terminals is connected directly to a first portion on one face of one of the electrical interconnection patterns, said first portion being located opposite to a second portion located on another face of the one of the electrical interconnection patterns that is held in contact with the surface of the polymer actuator;
   a focus detection section which detects a focus condition of a subject image provided by the optical system;
   a shake detection section which detects a shake of the optical unit; and
   a drive section which moves the image pickup device in a direction of an optical axis of the optical system based on a detection result of the focus detection section by means of the polymer actuator, and moves the image pickup device in a direction perpendicular to the optical axis of the optical system based on a detecting result of the shake detection section by means of the polymer actuator,
   wherein the polymer actuator is disposed in contact with at least an opposite side of the image pickup device to an optical surface thereof, and the electrical interconnection patterns are provided on the surface of the polymer actuator which is in contact with the image pickup device.

* * * * *